US011394790B2

(12) United States Patent
Felder et al.

(10) Patent No.: US 11,394,790 B2
(45) Date of Patent: Jul. 19, 2022

(54) METHOD, SYSTEM AND APPARATUS FOR PROVIDING ACTIVITY FEED FOR EVENTS TO FACILITATE GATHERING AND COMMUNICATING OF EVENT INFORMATION

(71) Applicant: Cvent Inc., McLean, VA (US)

(72) Inventors: Brian Felder, Portland, OR (US); David Shanley, Portland, OR (US)

(73) Assignee: CVENT INC., McLean, VA (US)

( * ) Notice: Subject to any disclaimer, the term of this patent is extended or adjusted under 35 U.S.C. 154(b) by 292 days.

(21) Appl. No.: 13/838,423

(22) Filed: Mar. 15, 2013

(65) Prior Publication Data

US 2014/0101248 A1  Apr. 10, 2014

Related U.S. Application Data

(60) Provisional application No. 61/711,427, filed on Oct. 9, 2012.

(51) Int. Cl.
*H04L 29/08* (2006.01)
*H04L 67/50* (2022.01)
(Continued)

(52) U.S. Cl.
CPC ............ *H04L 67/22* (2013.01); *G06Q 10/10* (2013.01); *G06Q 50/01* (2013.01); *H04L 67/20* (2013.01)

(58) Field of Classification Search
CPC ......... H04L 12/16; H04L 67/20; H04L 67/22; H04L 51/32; H04W 8/18; H04W 4/12;
(Continued)

(56) References Cited

U.S. PATENT DOCUMENTS 6,560,655 B1 * 5/2003 Grambihler ............ H04L 67/10
709/202
7,669,123 B2 * 2/2010 Zuckerberg et al. ......... 715/273
(Continued)

OTHER PUBLICATIONS

Search Report dated Dec. 23, 2013 issued by the International Searching Authority in related International Application No. PCT/US13/64139.

*Primary Examiner* — Michael Won
(74) *Attorney, Agent, or Firm* — Dickinson Wright PLLC

(57) ABSTRACT

System platform, software and hardware equipment and components, and methodologies are provided for gathering, organizing, distributing and synchronizing information about events, event attendees or group activities associated with events. Event management system and methods include mobile software application platform for event participants to receive push content, and generate and share real time activity feed(s) on various social media and/or dialogue platforms via a server that transmits push information (notifications, ads, alerts, updates) to event participant's mobile application, receives activity feed information from mobile application, and selectively transmits activity feed information to social media and/or dialog platforms. Events include conferences, tradeshows, seminars, or any activities involving one or more participants. Event participants include attendees, exhibitors, speakers, sponsors, organizers, or any other groups or individuals associated with event. Social media and/or dialogue platforms include Facebook, Twitter, LinkedIn, email, text messaging, or any other communication media supporting data transfer or sharing between users.

28 Claims, 30 Drawing Sheets

(51) Int. Cl.
*H04L 67/53* (2022.01)
*G06Q 10/10* (2012.01)
*G06Q 50/00* (2012.01)

(58) Field of Classification Search
CPC .......... H04W 4/06; H04W 4/21; G06Q 10/02; G06Q 10/00; G06Q 10/109; G06Q 10/10; G06Q 50/01
USPC ........ 709/204, 203, 205, 213, 217, 230, 248
See application file for complete search history.

(56) References Cited

U.S. PATENT DOCUMENTS

| | | | |
|---|---|---|---|
| 7,725,492 B2* | 5/2010 | Sittig et al. .................... 707/784 | |
| 7,991,764 B2 | 8/2011 | Rathod | |
| 8,140,099 B2* | 3/2012 | Vargas .................... H04L 29/06 370/324 | |
| 8,166,145 B2* | 4/2012 | Tran ..................... G06Q 10/109 709/223 | |
| 8,261,329 B2* | 9/2012 | Gurney ............... G06F 21/6245 705/7.18 | |
| 8,572,602 B1* | 10/2013 | Colton ................. G06F 17/3089 709/220 | |
| 8,650,252 B2* | 2/2014 | Rubinstein et al. .......... 709/204 | |
| 8,914,371 B2* | 12/2014 | Aggarwal ............... H04L 51/32 707/737 | |
| 9,390,405 B2* | 7/2016 | Boss .................... G06Q 10/109 | |
| 9,432,455 B2* | 8/2016 | Jeide .................. H04L 67/1095 | |
| 2003/0046304 A1* | 3/2003 | Peskin ................. G06Q 10/109 | |
| 2004/0169683 A1* | 9/2004 | Chiu ....................... G06F 16/40 715/776 | |
| 2005/0034079 A1* | 2/2005 | Gunasekar ............. G06Q 10/10 715/753 | |
| 2006/0015923 A1* | 1/2006 | Chuah .................. H04N 21/235 725/135 | |
| 2006/0048059 A1* | 3/2006 | Etkin .......................... 715/745 | |
| 2008/0085700 A1* | 4/2008 | Arora ..................... H04L 51/38 455/414.3 | |
| 2008/0126476 A1 | 5/2008 | Nicholas et al. | |
| 2009/0055292 A1 | 2/2009 | Chong et al. | |
| 2009/0186700 A1* | 7/2009 | Konkle .................. G06Q 10/10 463/42 | |
| 2009/0197619 A1 | 8/2009 | Colligan et al. | |
| 2009/0276419 A1* | 11/2009 | Jones .................. G06F 16/3322 | |
| 2009/0276855 A1* | 11/2009 | Anderson .............. G06Q 10/00 726/26 | |
| 2010/0205541 A1 | 8/2010 | Rapaport et al. | |
| 2010/0235748 A1 | 9/2010 | Johnson et al. | |
| 2010/0250672 A1* | 9/2010 | Vance .................. G06Q 10/109 709/204 | |
| 2011/0066674 A1* | 3/2011 | Piepenbrink ...... G06F 17/30029 709/203 | |
| 2011/0078018 A1 | 3/2011 | Rathod | |
| 2011/0078128 A1 | 3/2011 | Rathod | |
| 2011/0078129 A1 | 3/2011 | Rathod | |
| 2011/0078332 A1* | 3/2011 | Poon ..................... G06F 16/178 709/248 | |
| 2011/0078583 A1 | 3/2011 | Rathod | |
| 2011/0082881 A1 | 4/2011 | Rathod | |
| 2011/0113094 A1 | 5/2011 | Rathod | |
| 2011/0125906 A1 | 5/2011 | Rathod | |
| 2011/0131450 A1* | 6/2011 | Wheeler ............. G06F 11/3688 714/32 | |
| 2011/0145279 A1 | 6/2011 | Rathod | |
| 2011/0153413 A1 | 6/2011 | Rathod | |
| 2011/0153759 A1 | 6/2011 | Rathod | |
| 2011/0154220 A1 | 6/2011 | Rathod | |
| 2011/0161314 A1 | 6/2011 | Rathod | |
| 2011/0161319 A1 | 6/2011 | Rathod | |
| 2011/0161419 A1 | 6/2011 | Rathod | |
| 2011/0162038 A1 | 6/2011 | Rathod | |
| 2011/0179149 A1* | 7/2011 | Kazan ................... G06F 9/4451 709/221 | |
| 2011/0191417 A1 | 8/2011 | Rathod | |
| 2011/0208822 A1 | 8/2011 | Rathod | |
| 2011/0225293 A1 | 9/2011 | Rathod | |
| 2011/0231363 A1 | 9/2011 | Rathod | |
| 2011/0231489 A1 | 9/2011 | Rathod | |
| 2011/0246420 A1* | 10/2011 | Wang ................. G06F 17/3048 707/624 | |
| 2011/0276396 A1* | 11/2011 | Rathod ................. H04L 51/066 705/14.49 | |
| 2012/0004956 A1* | 1/2012 | Huston .............. G06Q 30/0207 705/14.1 | |
| 2012/0030282 A1 | 2/2012 | Brody et al. | |
| 2012/0041767 A1* | 2/2012 | Hoffman ............ A63B 24/0062 705/1.1 | |
| 2012/0042263 A1* | 2/2012 | Rapaport ............... G06Q 30/02 715/753 | |
| 2012/0124486 A1* | 5/2012 | Robinson ............. H04L 67/306 715/753 | |
| 2012/0179981 A1* | 7/2012 | Whalin .................. H04W 4/21 715/753 | |
| 2012/0215571 A1* | 8/2012 | Bracken ............. G06Q 50/265 705/5 | |
| 2012/0265805 A1* | 10/2012 | Samdadiya ......... G06F 11/3006 709/203 | |
| 2012/0269116 A1* | 10/2012 | Xing ................... G06F 17/3064 370/328 | |
| 2012/0278725 A1* | 11/2012 | Gordon ............ H04N 21/25891 715/738 | |
| 2012/0283855 A1* | 11/2012 | Hoffman ............ A63B 24/0062 700/91 | |
| 2013/0007576 A1* | 1/2013 | Lund .................. H04N 21/4307 715/203 | |
| 2013/0054720 A1* | 2/2013 | Kang ..................... G06Q 10/10 709/206 | |
| 2013/0066832 A1* | 3/2013 | Sheehan ................. G06Q 10/00 707/634 | |
| 2013/0066963 A1* | 3/2013 | Odio .................... H04L 65/403 709/204 | |
| 2013/0103757 A1* | 4/2013 | Mitchell ............... H04L 67/02 709/204 | |
| 2013/0124504 A1* | 5/2013 | Haugen .................. G06Q 50/01 707/722 | |
| 2013/0145282 A1* | 6/2013 | Zhao .................. G06Q 10/109 715/751 | |
| 2013/0232194 A1* | 9/2013 | Knapp ................... H04L 67/22 709/203 | |
| 2013/0275531 A1* | 10/2013 | Hahm ..................... H04W 4/12 709/206 | |
| 2013/0304822 A1* | 11/2013 | Tetreault ............ H04N 21/2187 709/204 | |
| 2013/0326589 A1* | 12/2013 | Butler ................. G06Q 30/0267 726/4 | |
| 2014/0039787 A1* | 2/2014 | Bourne ............... G01C 21/3469 701/400 | |
| 2014/0074629 A1* | 3/2014 | Rathod ............... G06Q 30/0277 705/14.73 | |
| 2014/0223462 A1* | 8/2014 | Aimone ................. G16H 40/67 725/10 | |
| 2014/0343990 A1* | 11/2014 | Photowat ........... G06Q 10/1097 705/7.17 | |
| 2015/0127628 A1* | 5/2015 | Rathod ................. G06F 16/955 707/710 | |
| 2015/0142689 A1* | 5/2015 | Squires ................. G01C 22/00 705/329 | |
| 2015/0199010 A1* | 7/2015 | Coleman ............... A61B 5/0006 345/156 | |
| 2015/0324751 A1* | 11/2015 | Orenstein .............. G01W 1/10 702/3 | |
| 2016/0004820 A1* | 1/2016 | Moore ................. H04L 63/1441 705/3 | |
| 2017/0006356 A1* | 1/2017 | Krasadakis ............ G10L 15/22 | |
| 2017/0186307 A1* | 6/2017 | Kim ...................... H04N 7/188 | |

* cited by examiner

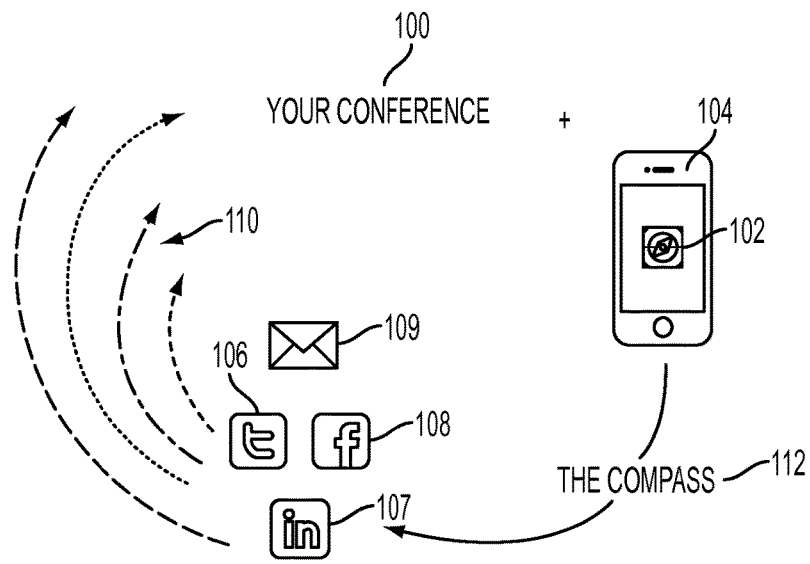
FIG. 1
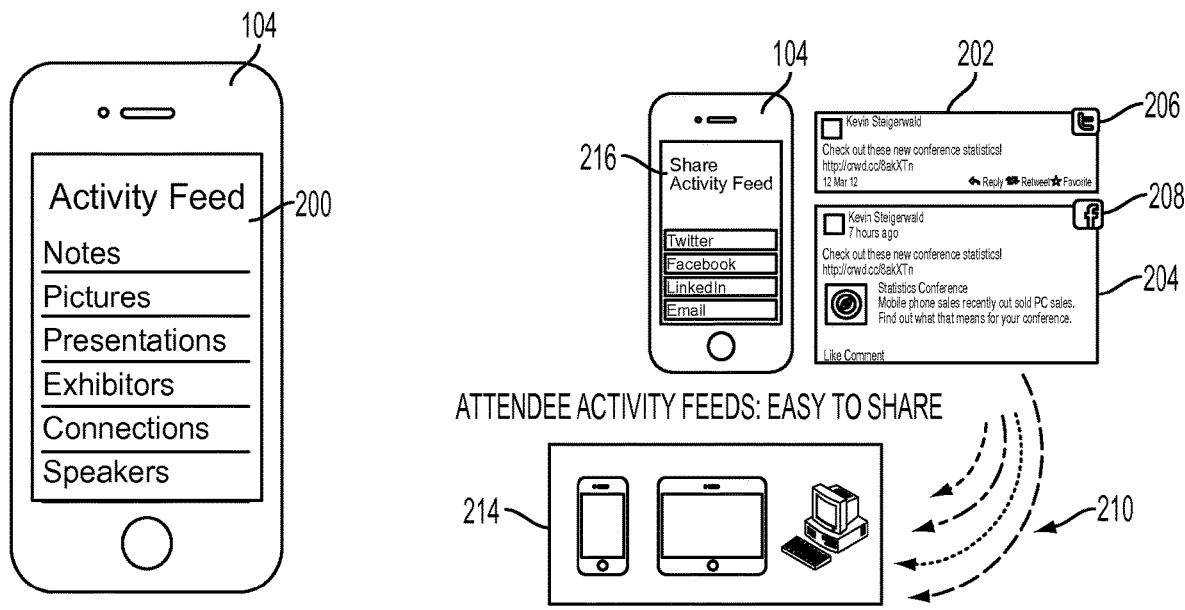
FIG. 2A
FIG. 2B

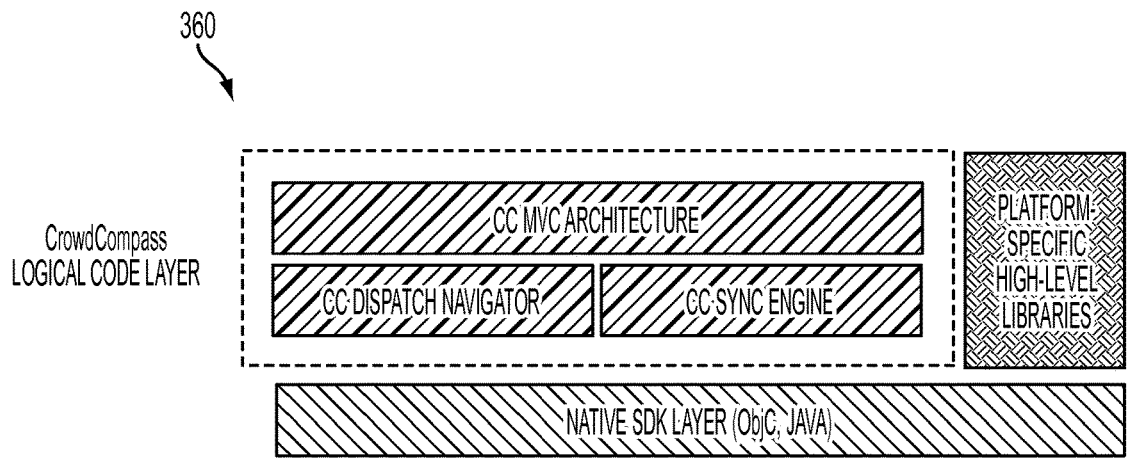

FIG. 3D

| FIELD OR PROPERTY | DESCRIPTION |
|---|---|
| OID | OBJECT IDENTIFIER. 10 CHARACTER ALPHA-NUMERIC VALUE SCOPED TO OBJECT TYPE. GENERALLY UNIVERSALLY UNIQUE SYSTEM-WIDE. THIS IS THE PRIMARY KEY FOR EACH DATA OBJECT IN THE SYSTEM. |
| created_at | DATETIME WHEN THE OBJECT WAS CREATED IN THE SYSTEM. THIS CAN BE USED TO IDENTIFY THIS ITEM AS A CANDIDATE FOR DOWNSYNC FROM THE SERVER OR UPSYNC FROM THE CLIENT. |
| updated_at | DATETIME OF LAST CHANGE TO THIS OBJECT. THIS IDENTIFIES THIS ITEM AS A POTENTIAL CANDIDATE FOR DOWNSYNC FROM THE SERVER OR UPSYNC FROM THE CLIENT. |
| last_sync | DATETIME OF LAST SYNC ACTIVITY. ON THE CLIENT, THIS GOVERNS WHETHER THIS ITEM IS A CANDIDATE FOR SYNC ACTIONS. |

FIG. 3E

METHOD, SYSTEM AND APPARATUS FOR PROVIDING ACTIVITY FEED FOR EVENTS TO FACILITATE GATHERING AND COMMUNICATING OF EVENT INFORMATION

CROSS-REFERENCE TO RELATED APPLICATIONS

This application claims priority to prior U.S. Provisional Patent Application No. 61/711,427 filed Oct. 19, 2012, the contents of which (including all attachments filed therewith) is hereby incorporated by reference in its entirety.

BACKGROUND OF THE INVENTION

1. Field of the Invention

The invention is in the field of gathering, organizing, distributing and synchronizing information across portable and web-based devices, such as and without limitation mobile smart phones, workstations, personal computers, laptops and the like. Generally, exemplary embodiments of the present invention provide system platform, software and hardware equipment and components, and methodologies for gathering, organizing, distributing and synchronizing information about one or more events, including without limitation any social occasion or activity such as conferences, concerts, meetings, sports, etc., and individual event attendee or group activities associated with one or more events.

2. Discussion of the Background of the Invention

Various conventional methods and systems exist for generating and distributing information about events to mobile users including those described in the following U.S. patents and published patent applications.

U.S. Pat. No. 6,647,257 titled "System and Method For Providing Targeted Messages Based on Wireless Mobile Location" describes providing messages to a subscriber of a mobile service based on location of mobile device, where targeting messages is based on identified mobile call signal, historic response data and identity of mobile terminal.

U.S. Pat. No. 6,889,054 titled "Method And System For Schedule Based Advertising On A Mobile Phone" describes pushing ads to mobile device including user preferred schedule for push ads, and controlling push ads based on user preferred schedule.

U.S. Pat. No. 7,027,801 titled "Method Delivering Location-Base Targeted Advertisements To Mobile Subscribers" describes receiving a push ad from an external server and sending it to mobile terminal based on: mobile terminal ID; received mobile terminal location; and Picocell service areas of mobile device, or products/services identified in a user profile.

U.S. Pat. No. 7,051,105 titled "System And Method For Distributing Management Events To External Processes" describes providing notifications to client computer for computer event management including receiving and matching notification types, and client sending notification to a listener on network.

U.S. Pat. Nos. 7,076,244 and 7,711,769 both titled "System And Method For Pushing Information To A Mobile Device" describe how to display ads on a mobile device including categorizing static, dynamic or default ads, and combining and displaying static with dynamic or default ad. These patents also describe how to push information to a mobile device where server stores information in pre-defined categories (channels), database server sends notification to proxy server at each change in the information, and a channel is selected for sending notifications to a mobile device according to the type of information.

U.S. Pat. No. 7,873,708 titled "System And Method For Distributing Management Events To External Processes" describes providing multimedia content to wireless device including receiving search query by wireless device, sending content to wireless device based on query, sending updated content to device, and receiving preference by device.

U.S. Published Patent Application, Pub No. 2008/0085700 titled "Event Update Management System" describes sending alerts to registered mobile users requesting alerts regarding an event.

U.S. Published Patent Application, Pub No. 2010/0250672 titled "Providing Event Data To A Group Of Contacts" describes an event coordination service providing event data to computing devices where data is displayed to contacts in a group continuously during an event, and updated.

U.S. Published Patent Application, Pub No. 2012/0071129 titled "Methods And Apparatuses For Transmission Of An Alert To Multiple Devices" describes sending alerts from one device to another device in response to not receiving periodic message at one mobile device.

U.S. Published Patent Application, Pub No. 2010/0102091 titled "Automated Blogging And Skills Portfolio Management System" describes blogging and portfolio management accessible via mobile app, including organizing plurality of messages from plurality of mobile devices based on current event, having messages accessible by other mobile device, and organizing and publishing messages in a portfolio.

None of these conventional systems or methods address the need for gathering from the attendees information about the event and providing this information to the event attendees as well as third parties, or to synchronize information about the event among event attendees let alone doing so during an event, or by utilizing social media. Likewise, none of these conventional systems or methods addresses the need to share or broadcast the information about the event among event attendees and third parties.

SUMMARY OF THE INVENTION

Exemplary embodiments of the present invention address at least the above problems and/or disadvantages and provide at least the advantages described below.

Exemplary embodiments of the present invention provide an event management system and methods including a mobile software application platform for event participants to receive push content, and to generate and share real time activity feed(s) on various social media and/or dialogue platforms via a server.

According to exemplary implementations of embodiments of the present invention, managed events include conferences, tradeshows, seminars, or any activities involving one or more participants.

According to exemplary implementations of embodiments of the present invention, event participants include attendees, exhibitors, speakers, sponsors, organizers, or any other groups or individuals associated with the event.

According to exemplary implementations of embodiments of the present invention, social media and/or dialogue platforms include FACEBOOK, TWITTER, LINKEDIN, email, text messaging, or any other communication media supporting data transfer or sharing between users.

According to exemplary implementations, a server of an event management system and methods of exemplary embodiments of the present invention transmits push information (notifications, ads, alerts, updates) to an event participant's mobile application, receives activity feed information from the mobile application (via a graphical user interface), and selectively transmits the activity feed information to social media and/or dialog platforms, allowing users to share the activity feed information via the social media platform with their network.

According to exemplary implementations of embodiments of the present invention, push information transmitted by a server can include notifications, ads, alerts, updates, and any other information generated by the server and/or selectively input and/or chosen by a user.

According to exemplary implementations of embodiments of the present invention, the push information and/or activity feeds regarding an event include notifications, advertisements, registration information, comments, notes, pictures, maps, documents, schedules, contact info, web page, presentations, analytics, dialogue with others, and other feeds.

According to exemplary implementations of embodiments of the present invention, activity feeds are generated by user on a mobile device, or any other web-based or communication device capable of transmitting information to a social media or dialogue application, where the activity feeds are transmitted to social media or dialogue application via a server.

According to exemplary implementations of embodiments of the present invention, the push information can be generated by third parties and provided to the server for pushing to a participant's mobile application, or any other web-based or communication device capable of receiving push information from the server.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 1, 2A and 2B are a generalized illustration of a system platform and platform components according to an exemplary embodiment of the present invention.

FIGS. 3A-3I are illustrative examples of topology and architecture, as well as certain complementary component features, of a system and methodology according to exemplary embodiments of the present invention.

DETAILED DESCRIPTION OF EXEMPLARY EMBODIMENTS

Figure 3A:
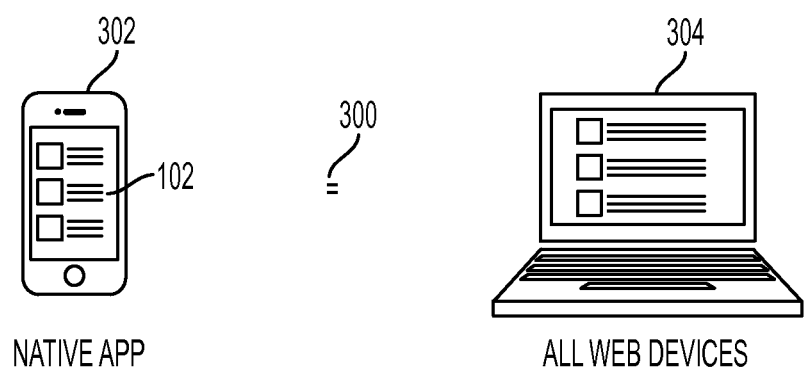

Referring now to the drawings, wherein like reference numerals designate identical or corresponding parts throughout the several views, embodiments of the present invention are shown in schematic detail. A skilled artisan will readily appreciate that any references to specific software, tools and/or components by their manufacturer or brand name are merely for exemplary purposes and not to limit the scope of the invention.

The matters defined in the description such as a detailed construction and elements are nothing but the ones provided to assist in a comprehensive understanding of the invention. Accordingly, those of ordinary skill in the art will recognize that various changes and modifications of the embodiments described herein can be made without departing from the scope and spirit of the invention. Also, well-known functions or constructions are omitted for clarity and conciseness. Certain exemplary embodiments of the present invention are described below in the context of commercial application. Such exemplary implementations are not intended to limit the scope of the present invention, which is defined in the appended claims.

Referring to FIGS. 1, 2A, 2B, 21, and 22 exemplary embodiments of the present invention provide a platform which includes a server or multiple servers ("Compass server" as may be referenced throughout this application for consistency and ease of understanding) for gathering and distributing information about events, such as conferences. As illustrated in a generalized FIG. 1, according to an illustrative non-limiting example of the present invention, a mobile application 102 (a "CrowdCompass" app, a "Compass" app, or an "app," as may be referenced throughout this application for consistency and ease of understanding) executed on, for example, a mobile device 104 facilitates generation of a user's personal activity feed 200 for an event 100 they are attending or did attend. An activity feed 200 comprises user's activities at an event 100, for example activities displayed on a screen of a mobile device, and the user's interactions with other people and experiences at an event 100, for example in chronological order or as a timeline.

Figure 21:
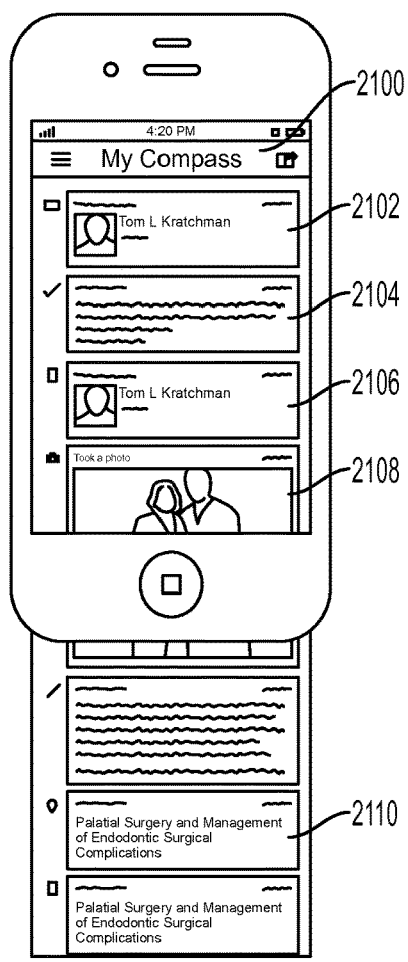
FIG. 21 illustrates and example of a mobile device having a user account according to an exemplary embodiment of the present invention

As illustrated in the example of FIG. 21, according to exemplary embodiments of the present invention the platform facilitates hosting of user accounts ("my Compass" or "user's Compass" as may be referenced throughout this application for consistency and ease of understanding). A user's accounts ("My Compass") 2100, for example accessed via the app 102, can include a collection of a user's activity during an event, or activities in a user's activity feed 200. For example, an individual user's Compass can serve as a single source to facilitate, for example, keeping track of connections made, sessions attended, notes taken and/or photos made for an event. As further illustrated in the example of FIG. 21, the app allows a user to create/view 2102 connections associated with an event, create/view 2104 notes associated with an even (such as, but not limited to, notes taken during an even session and/or about a speaker or an organizer), view/find/create 2106 bookmarks (such as people or activities) associated with an event, create/view 2108 photos associated with an event, and keep track 2110 of sessions (for example, attended sessions) associated with an event.

According to an exemplary implementation of the present invention, any and all of the user's experiences 202, 204 at an event 100 can be gathered in such a personal activity feed 200. The user can then broadcast 216 this information within the event app and also selectively provide 112 all or part of the gathered information for transmission 110, 210 using traditional social networks 106-109, 206, 208. An exemplary benefit achieved by deployment of the app 102 according to exemplary embodiments of the present invention it to promote the event 100 through transmission 110, 210, or sharing 216, of individual user's feeds 200 to plurality of other web-based end users 214, thereby potentially increasing the event's popularity.

Figure 22:
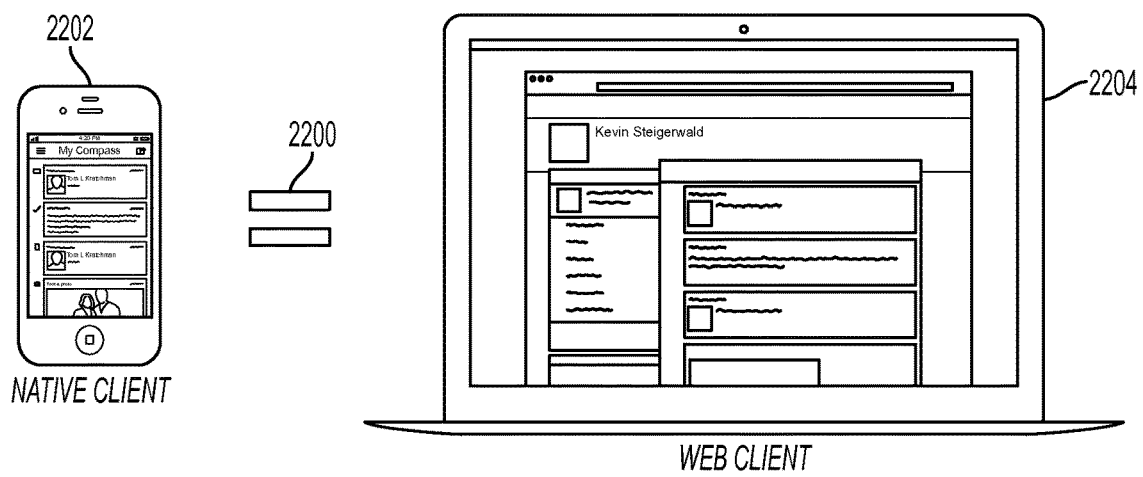
FIG. 22 is a generalized illustration of synchronization of various system components according to an exemplary embodiment of the present invention.

As illustrated in generalized diagrams of FIGS. 3A and 22, exemplary embodiments of the present invention provide for universal synchronization 300, 2200 of information across all devices 302, 2202 and 304, 2204, including without limitation information gathered from individual or group users via app 102 executing on user's devices 302, 2202, or on essentially any web-based platform 304, 2204.

Figure 3B:
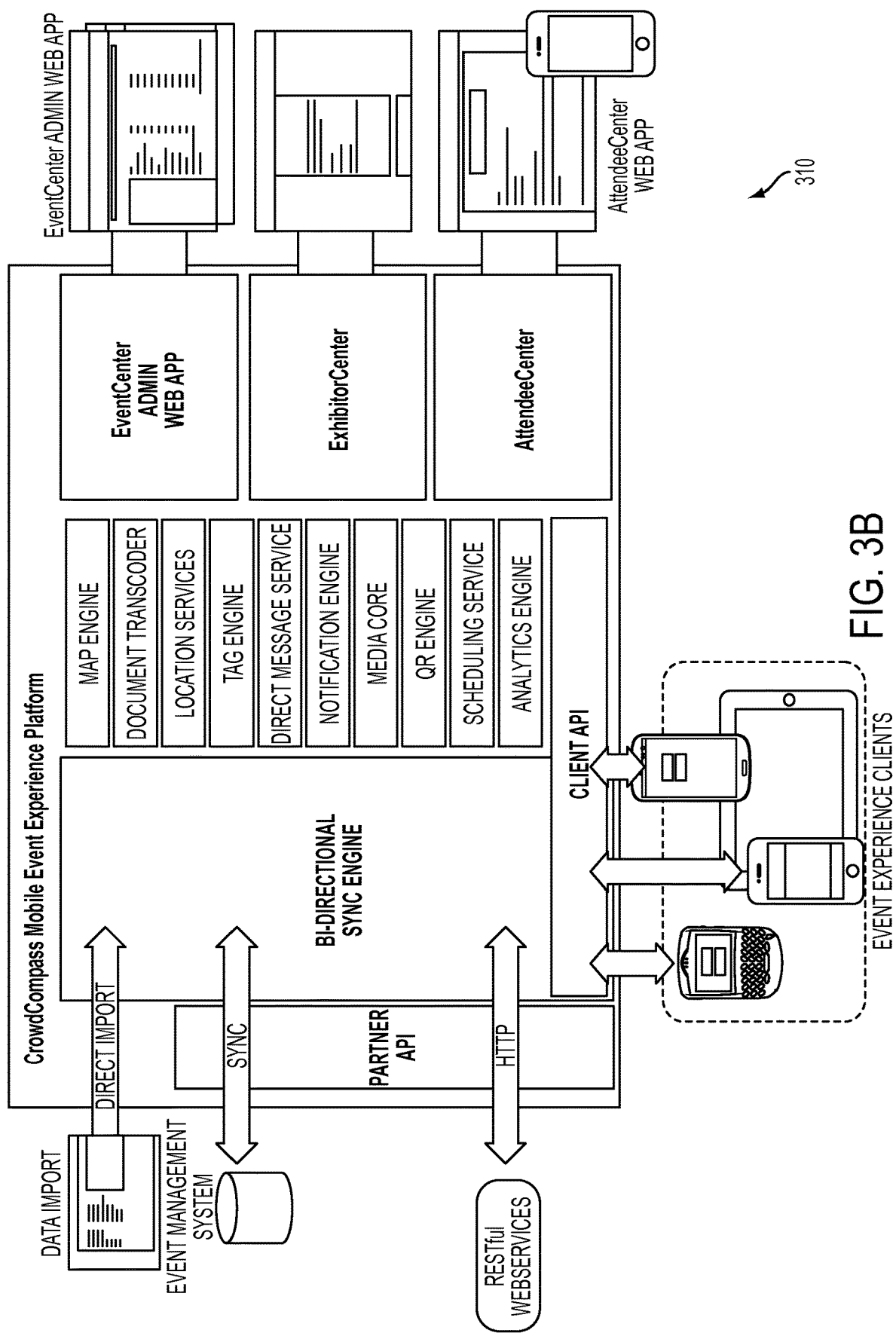
Figure 3C:
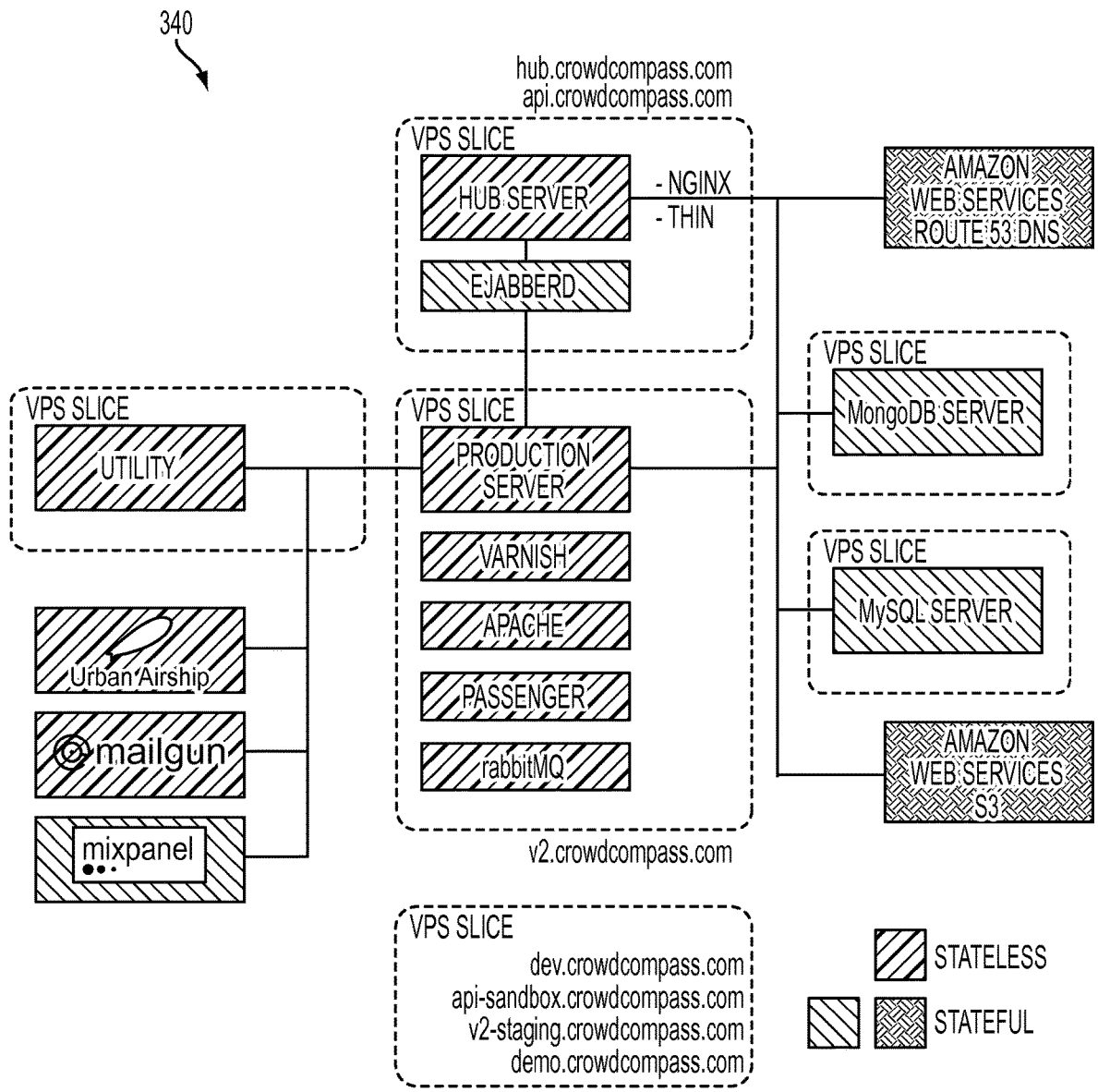

FIGS. 3B and 3C illustrate examples (labeled for reference as "CrowdCompass") of a logical architecture 310 and topology 340 diagrams of an exemplary embodiment of the present invention including associated client, server and network architectures. In the example of FIGS. 3B and 3C, CrowdCompass infrastructure can be deployed on a data center or centers and associated server or servers. The infrastructure can be designed to be both horizontally and vertically scalable and scripted for reduced time in creating new instances of the production stack. A configuration management and systems integration framework can used to configure and provision the environments. Third-party dependencies can include services providing device push notifications, email, metrics, and DNS, S3. In an exemplary implementation, third party metrics dependency can be replaced by internally-developed logging, metrics, and analytics.

Referring further to exemplary embodiment illustrated in FIGS. 3B and 3C, CrowdCompass mobile clients natively support various operating systems and platforms, including without imitation iOS, Android, and BlackBerry. One of the features of the architecture of exemplary embodiments of the present invention is removing dependence on third-party platforms, which gives CrowdCompass the flexibility to take advantage of the latest new features offered by any of the supported system components at the time of each respective software development kit (SDK) release. Another exemplary implementation 360 provides for maintaining common logical code across all platforms for reuse using, for example, an invocation system centered around dispatching internal, client-only, uniform resource identifiers (URIs) tied to client-specific actions and objects as generally illustrated in FIG. 3D. Such a feature can, for example, facilitate rapid and flexible reuse of components and configuration over the wire and through the local database.

According to exemplary embodiments of the present invention, client server communication includes mobile clients communicating with the server over Hyper Text Transfer Protocol (HTTP) and Transmission Control Protocol (TCP), for example for Direct Messaging features. In an exemplary implementation, CrowdCompass native mobile clients can work offline for most features, such as for example and without limitation schedule, agenda, maps, sponsors, sponsored content, QR scanning, and more, and take full advantage of the network when it is available for functions such as for example and without limitation TWITTER, contact exchange, personal schedules, content updates, and more, via a synchronization engine which can be built into the CrowdCompass Content Management System (labeled, for example for reference only and without limitation, as "Event Center") and each mobile client.

According to an exemplary embodiment of the present invention, synchronization strategy can be based on polling at app startup and defined intervals to ensure all content is up to date. According to another exemplary embodiment, synchronization can use push-to-pull notification where available based on device, platform, and connectivity. Clients can communicate to a web service endpoints using, for example, lightweight Java Script Object Notation (JSON) calls over HTTP to retrieve JSON encoded responses. All responses can be compressed (for example, "gzip'd") to decrease bandwidth consumption. In an exemplary implementation, each data object in the system follows a pattern by which it may be uniquely identified (using for example and Object Identifier, oid) and all creation and last update date times can be tracked, in order to facilitate the system-wide synchronization. FIG. 3E is a table summary of exemplary function and features 365 that can be used to facilitate synchronization in accordance with exemplary embodiments of the present invention.

Figure 3F:
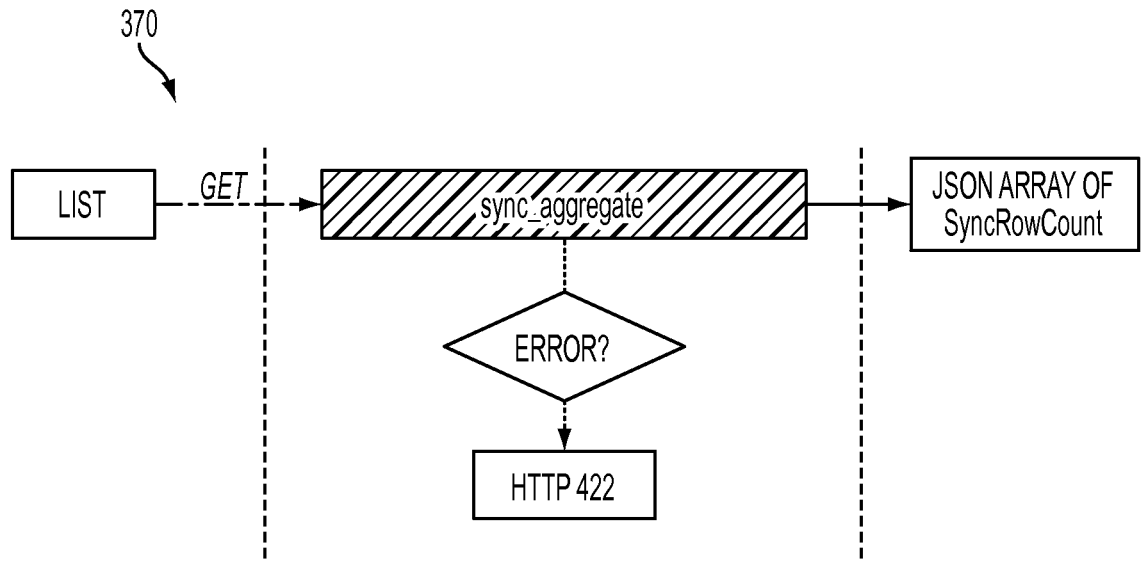
Figure 3G:
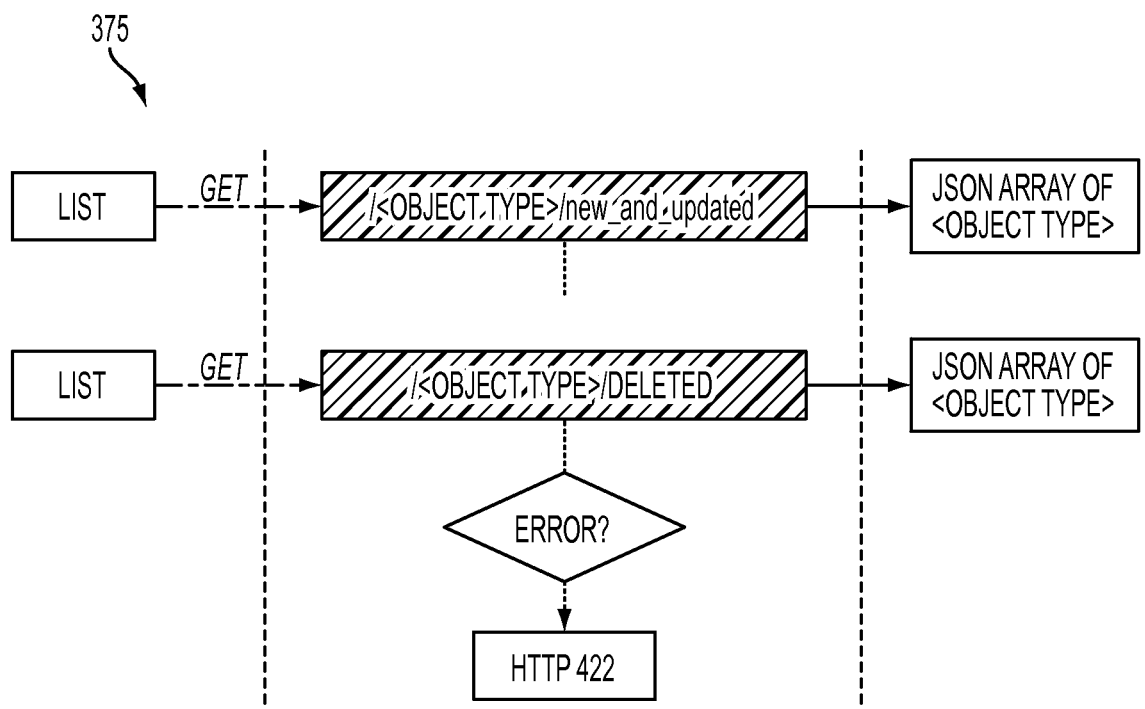
Figure 3H:
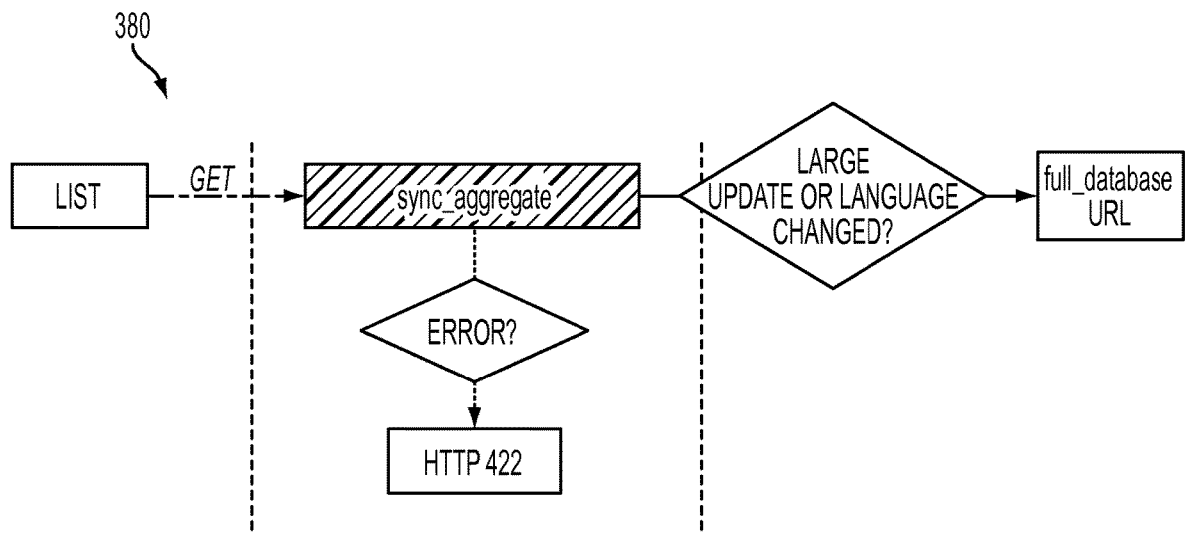
Figure 3I:
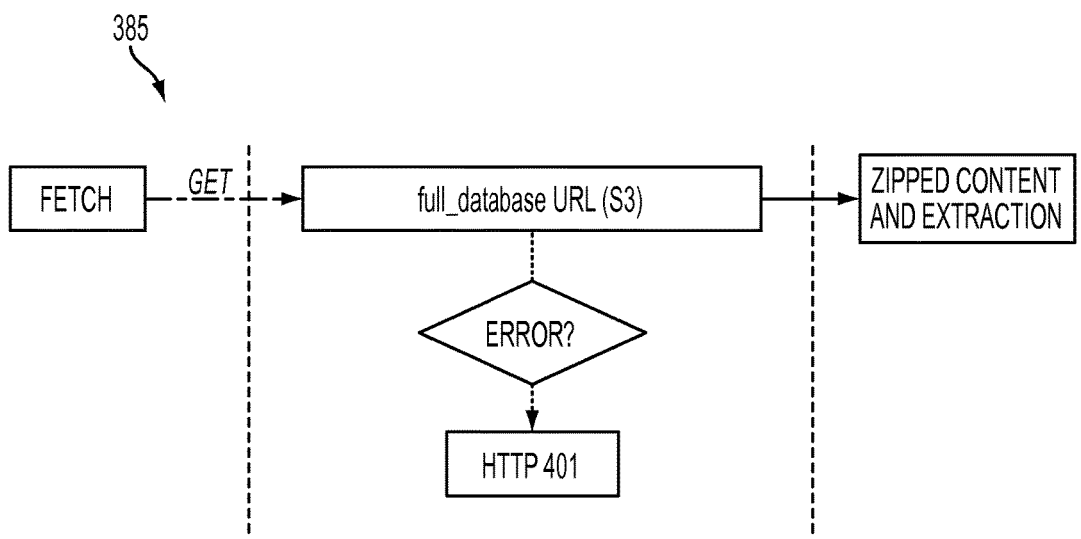

According to an exemplary implementation, a synchronization system can be designed for both incremental updates, as illustrated in example flowcharts of FIGS. 3F and 3G, and full local content (database, assets) replacement, as illustrated in example flowcharts of FIGS. 3H and 3I. FIGS. 3F and 3G show an example of GET process flows 370, 375 where client requests new, updated, and deleted objects. FIGS. 3H and 3I show an example of GET process flows 380, 385 including a full database response where client requests new, updated, and deleted objects. A benefit of background synchronization and incremental updates is that a user experience can be uninterrupted and the user not blocked from using the mobile application during synchronization.

According to an exemplary embodiment of the present invention, synchronization system scales to handle large content updates which are common in the industry as content is overhauled and details are finalized close to the event start date. For example, if more the N (N=250, configurable) records are updated in the Event Center for a given event, the server sends the full_database response back to the client upon content update request (sync_aggregate), as illustrated in the example of FIGS. 3H and 3I. In response, the server sends a full database (for example, tailored for the appropriate platform) down to the client for unzipping and extraction. This process can be fast and efficient for large scale updates, but may block the user interface (UI) for the user for a short period.

According to an exemplary embodiment of the present invention, internationalization (i18n) support can be achieved via a method where a locale and language are sent with each request. If the client language setting differs from the default database (typically English), then content (database) with the matching language is sent back to the client, if available. The client unpacks the new language, fully replacing the default, shipped database and the user continues their experience in their desired language.

In yet another exemplary implementation utilizing a Q3-end, a full-database process can be employed to enable multi-event support within a single application. Such an implementation can be designed for example for a corporate meeting space where a single app will typically host a variety of regional meetings complete with their own set of maps, schedule, agenda, and branded graphics. A user can select what event they want to experience from a higher UI layer such that complete event information can be downloaded for local and offline use.

Figure 4B:
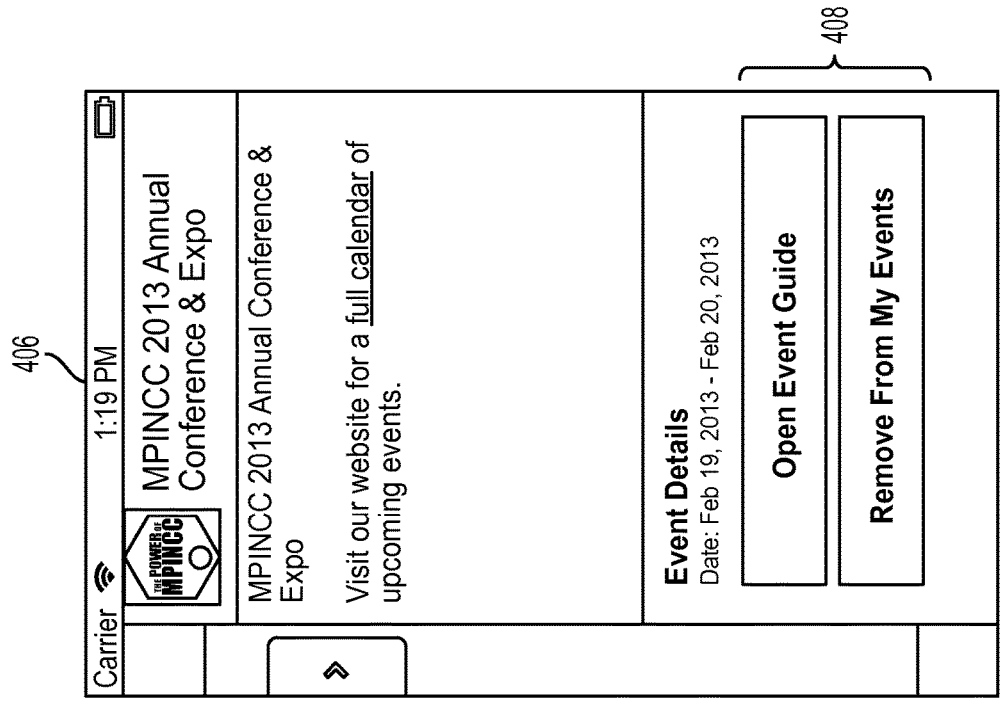
FIGS. 4A and 4B are a generalized illustration of certain functionality provides by an app according to an exemplary embodiment of the present invention.
Figure 4A:
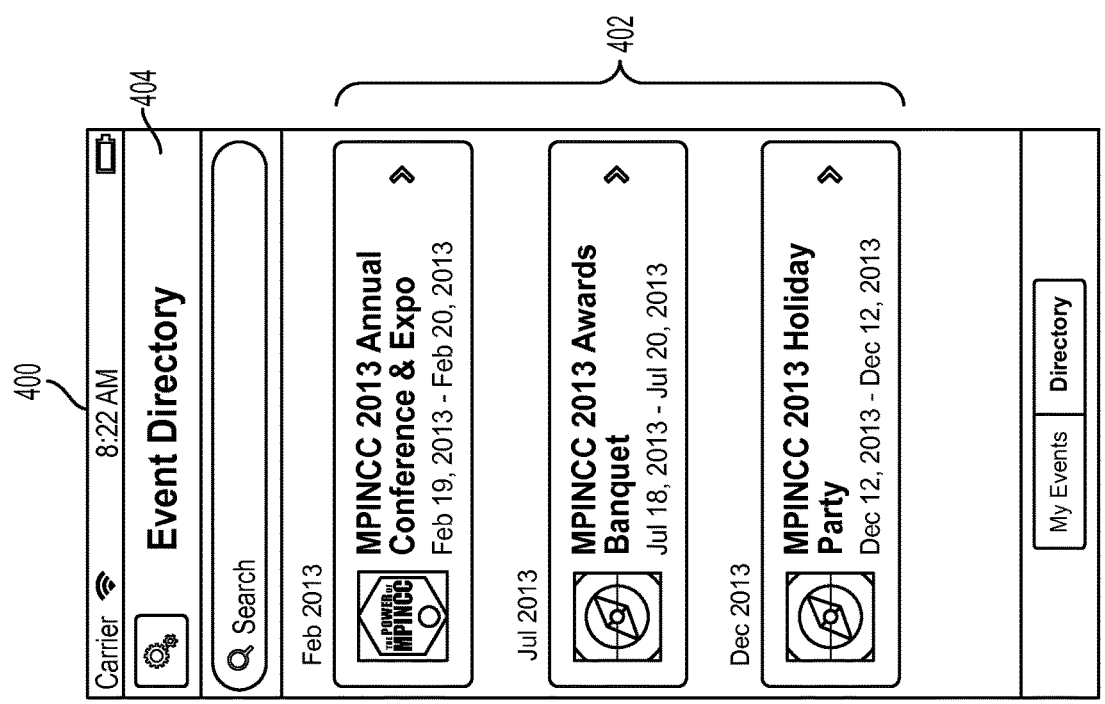
Figure 5:
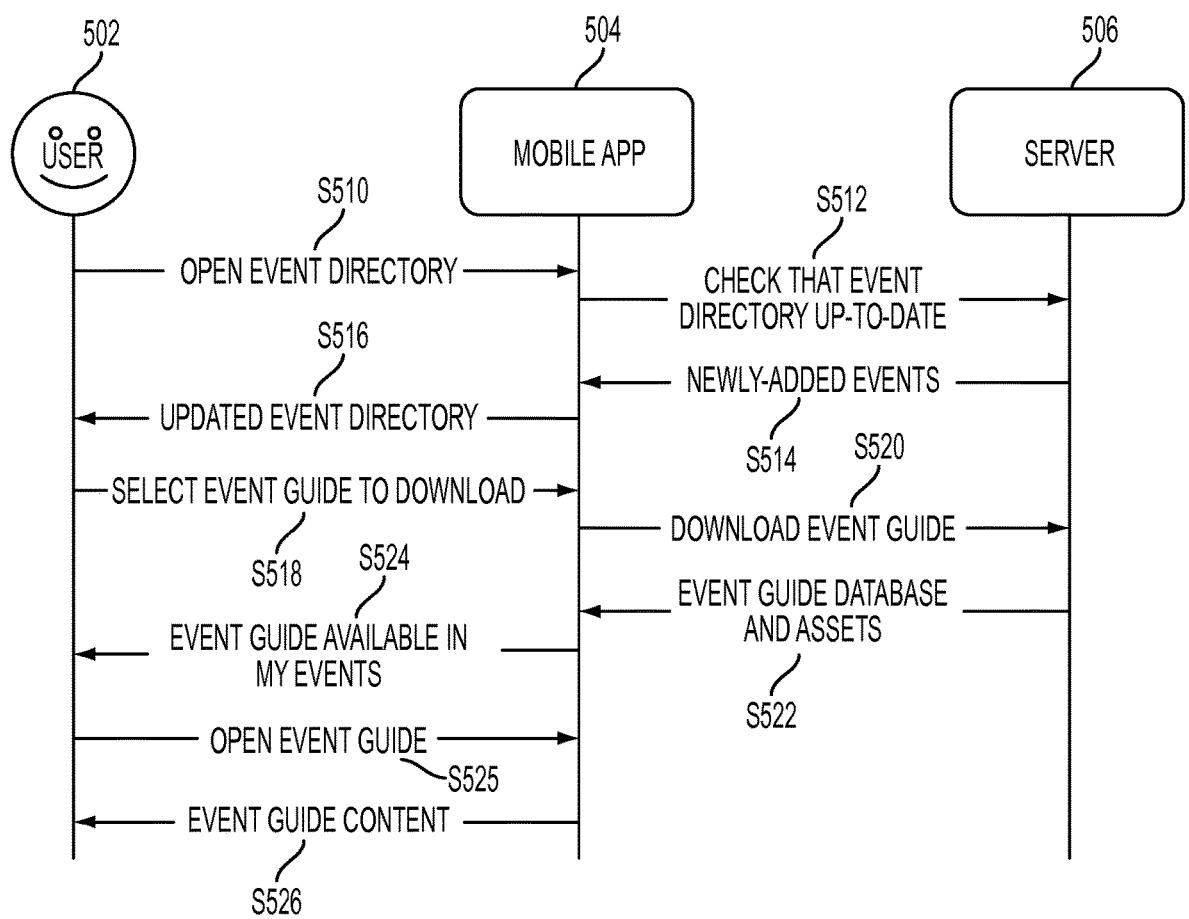
FIG. 5 shows an example of a process flow according to a feature of an exemplary embodiment of the present invention.

Referring now to FIGS. 4A, 4B and 5, according to an exemplary embodiment of the present invention, an app 400 can include multiple event guides 402 residing in app event directory 404. By selecting one of the event guides 402, a user is prompted to download or open, or remove 408 the selected event guide 406. In an exemplary implementation, the associated process flow is illustrated in FIG. 5 where: user 502 opens S510 event directory in an app 504, which checks S512 that the event directory is up-to-date by referencing Compass server 506, which provides S514 any newly-added events to app 504, which updated S516 event directory opened by user 502; user 502 selects S518 event guide to download in app 504, which downloads S520 the event guide by referencing Compass server 506, which provides S522 event guide database and assets to app 504, which makes the event guide available S524 in my events of user's 502 Compass; and user 502 can then open S525 the event guide in app 504, which provides S526 event guide content to user 502.

Figure 6:
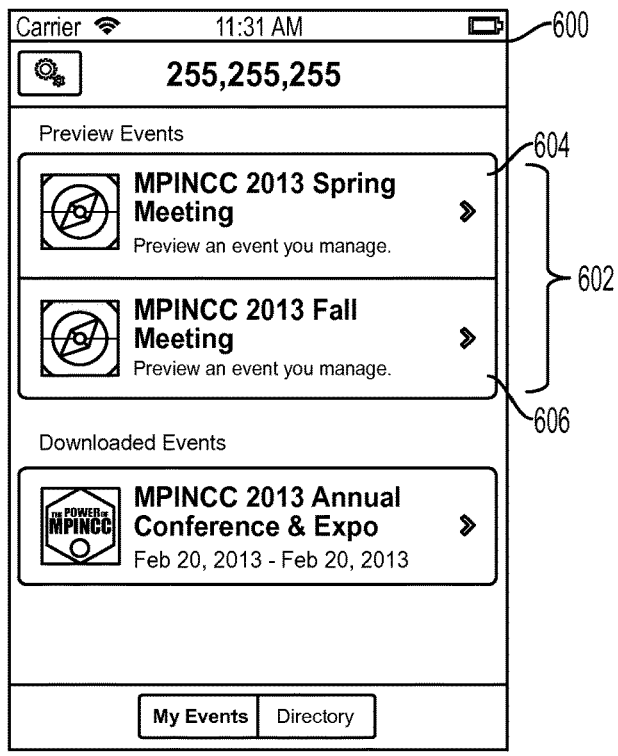
FIG. 6 shows an example of another feature of an exemplary embodiment of the present invention.

Referring to FIG. 6, according to an exemplary embodiment of the present invention, before publishing an event guide to an app 600, an event organizer has the opportunity to preview 602 one or more of the event guides 602 in the app 600 across mobile devices. In the example of FIG. 6, two event guides 604, 606 appear greyed-out for the organizer, indicating that these event guides are in preview mode, so only the organizers previewing these events can see, or have access to, these event guides.

Figures 7A, 7B:
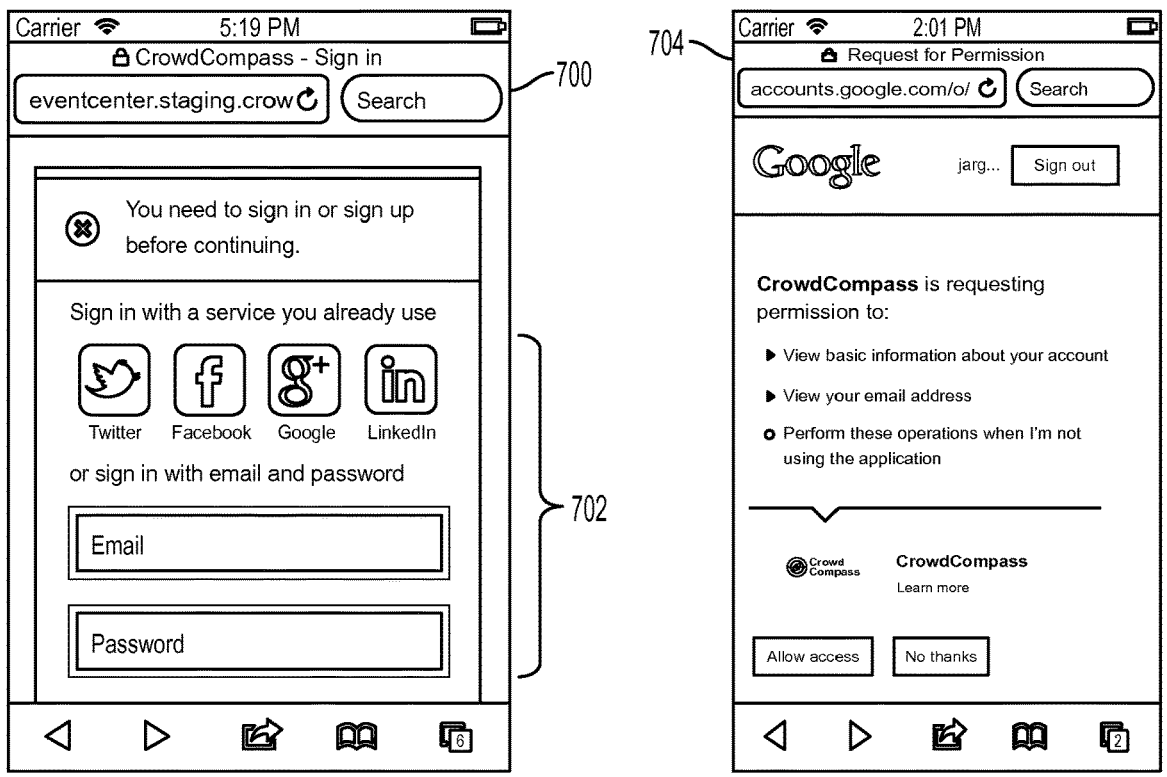
FIGS. 7A, 7B and 8 show an example yet another feature of an exemplary embodiment of the present invention.
Figure 8:
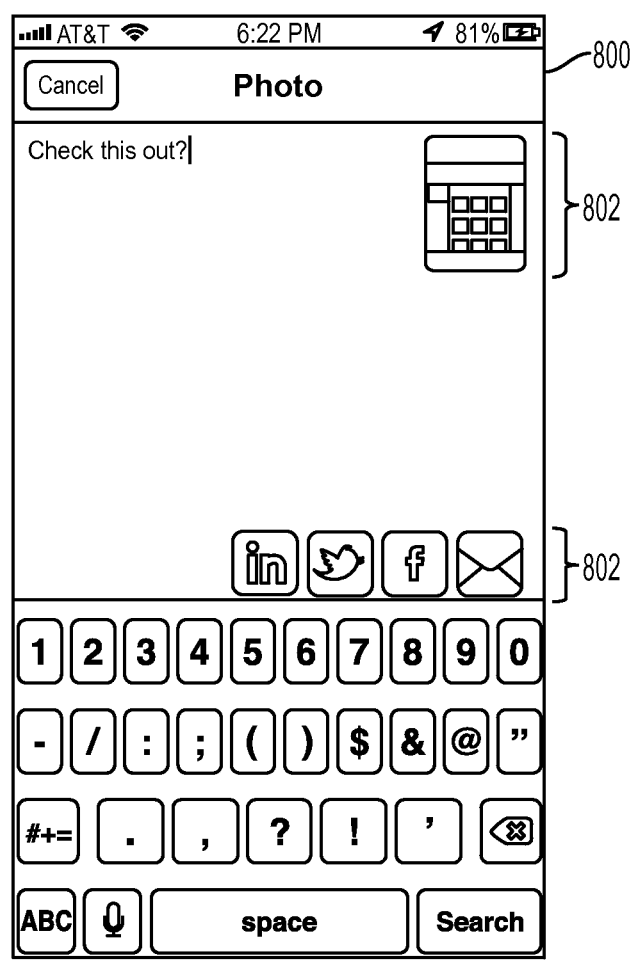

Referring to FIGS. 7A, 7B, 8, according to an exemplary embodiment of the present invention, a social login feature 700 allows an event attendee to sign into a Compass system using a third-party login service 702, rather than requiring their own password on the Compass system. This also opens up the door for social sharing to the networks 702 against which the user has authenticated. After the user has tied their account to social network services, as illustrated in the example 704 of FIG. 7B, users have the ability to share items 802 from the apps 800 to their social networks 802, for example multiple social networks at a time. Items can also be simultaneously shared to the user's Compass.

Figure 9:
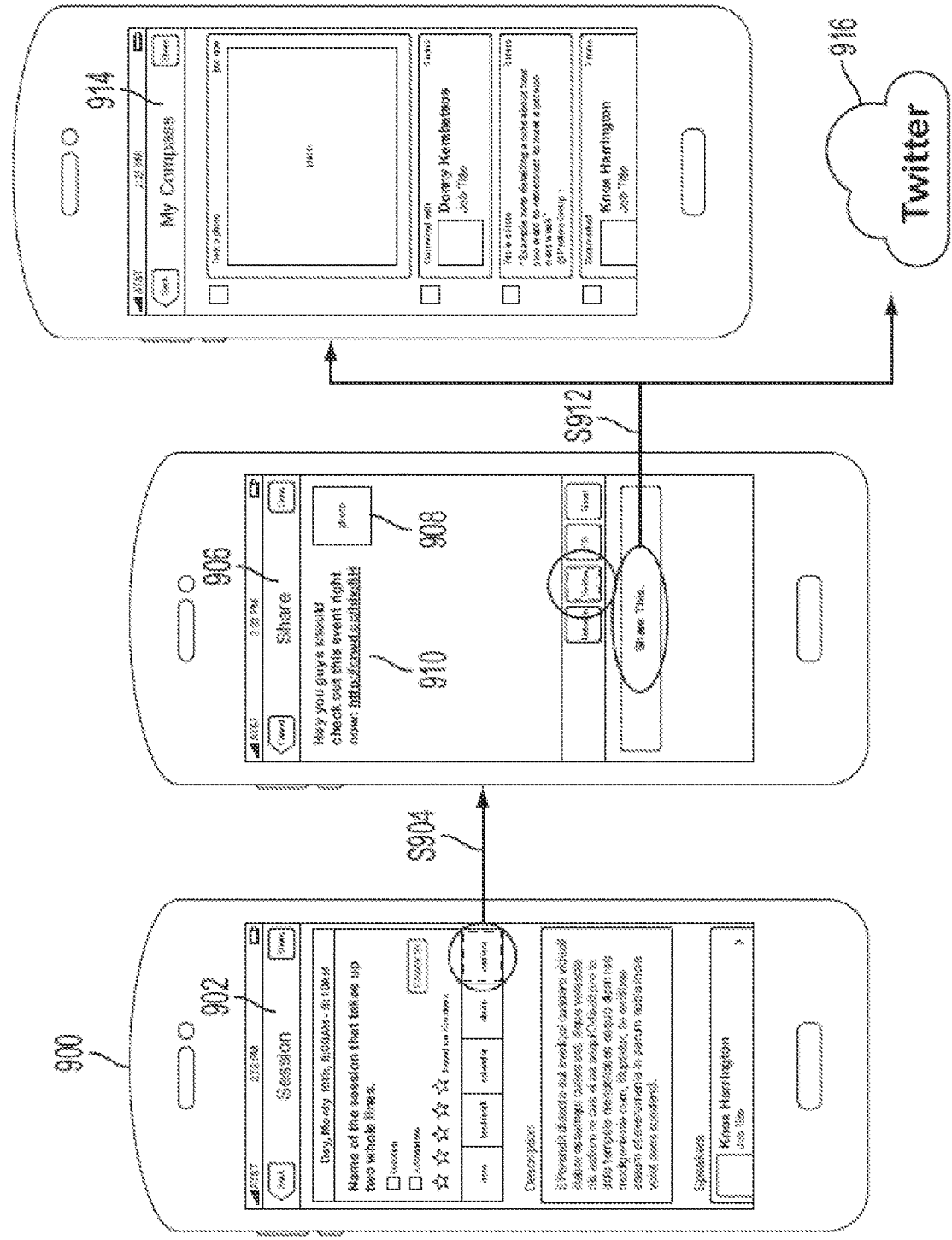
FIG. 9 shows an example of functionality and associated process flow according to an exemplary embodiment of the present invention.
Figure 10:
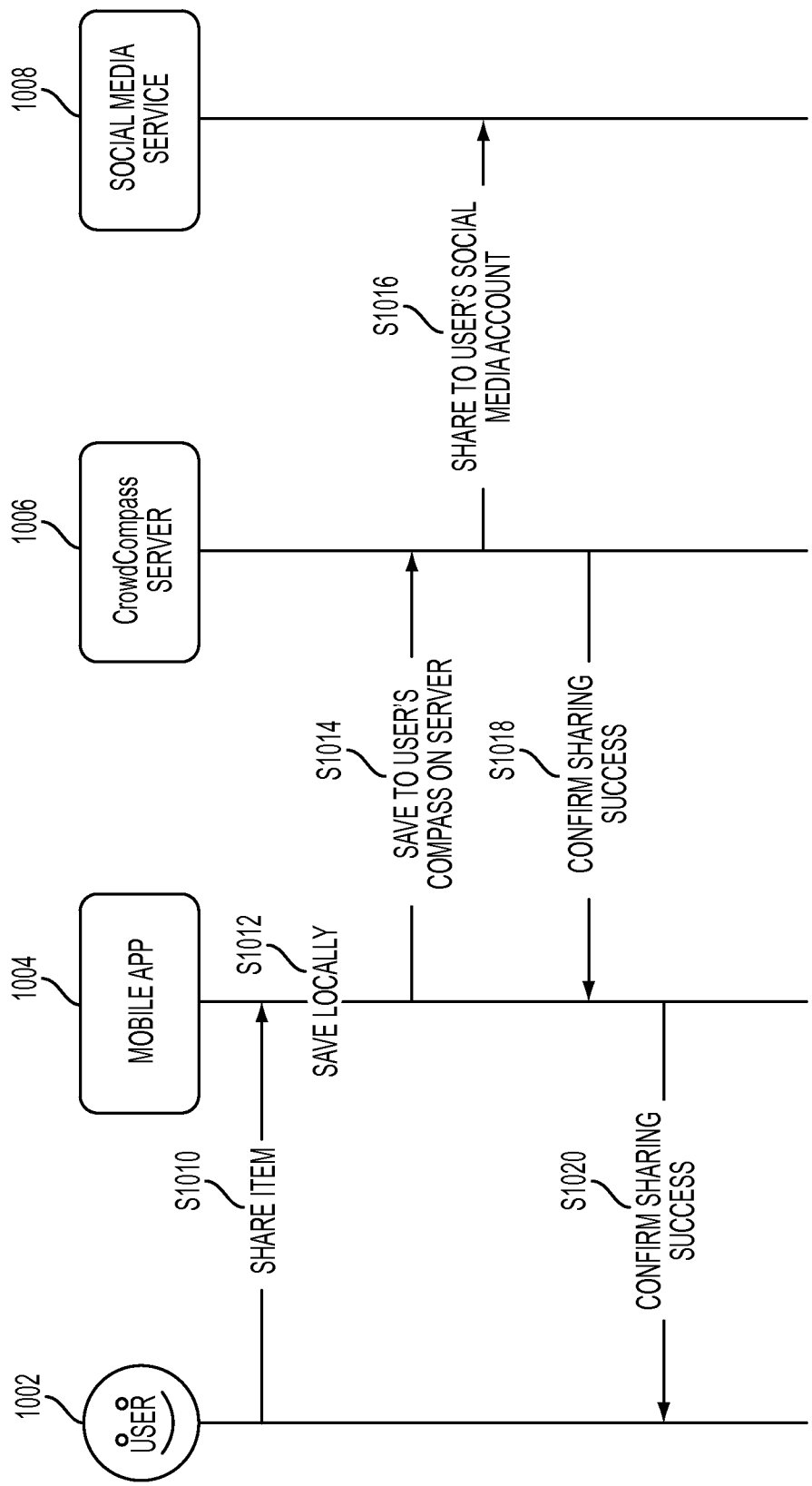
FIG. 10 shows an example of another process flow according to a feature of an exemplary embodiment of the present invention.

In an exemplary implementation illustrated in FIG. 9, where a Compass user accesses, via an app on mobile device 900, session 902 of a Compass event, user can select S904 information to share 906, such as photograph 908 and a link 910 to Compass event, and then push out S912 this information to the user's Compass ("My Compass") 914 and to user's social media account 916. The associated process flow is illustrated in FIG. 10, where: user 1002 provides S1010 share item for an app 1004 to be saved S1012 locally in app 1004, which provides S1014 share item to user's Compass server 1006, which provides S1016 share item to user's social media account 1008, and confirms S1018 successful completion of sharing operation to mobile app 1004, which in turn confirms S1020 successful completion of sharing operation to user 1002.

Figure 11:
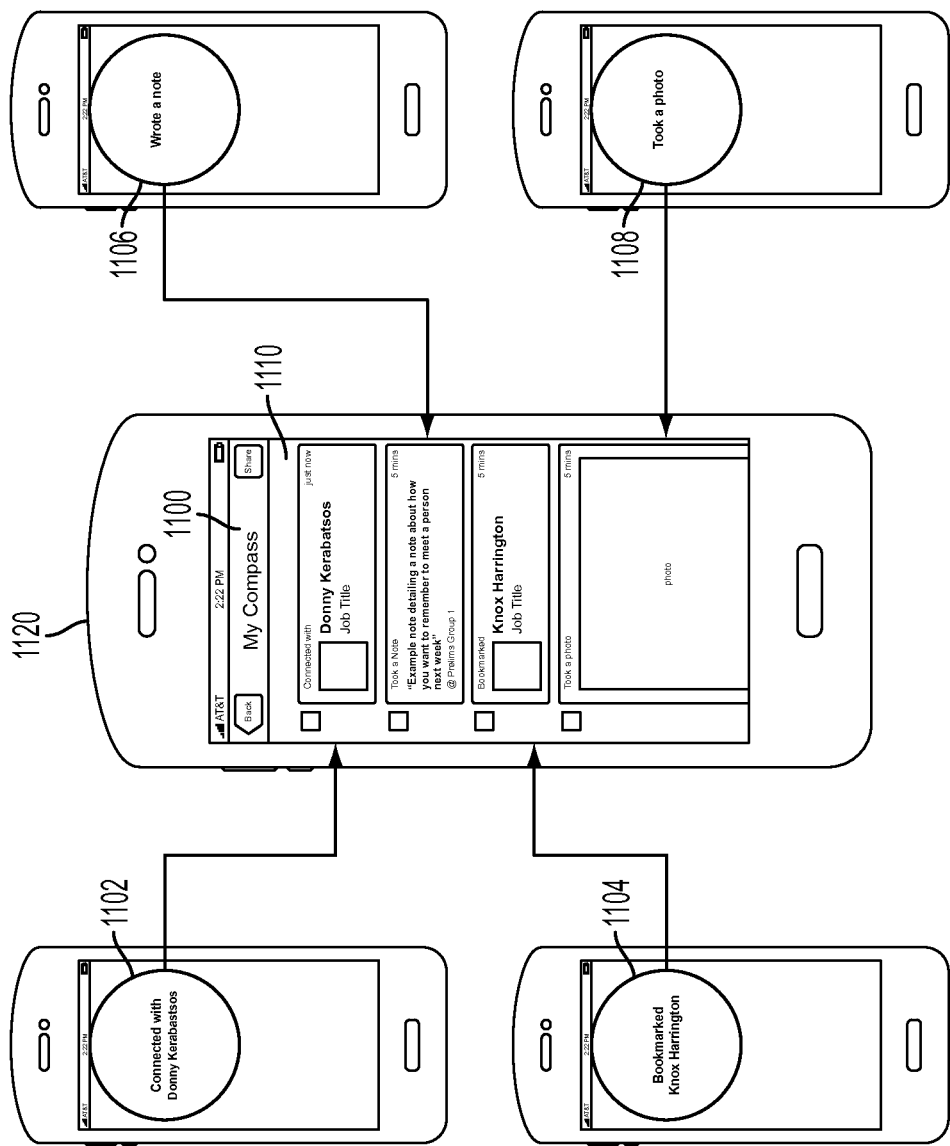
FIGS. 11 and 12 shows examples of functionality, information processing and display on various software and hardware platforms according to an exemplary embodiment of the present invention.
Figure 12:
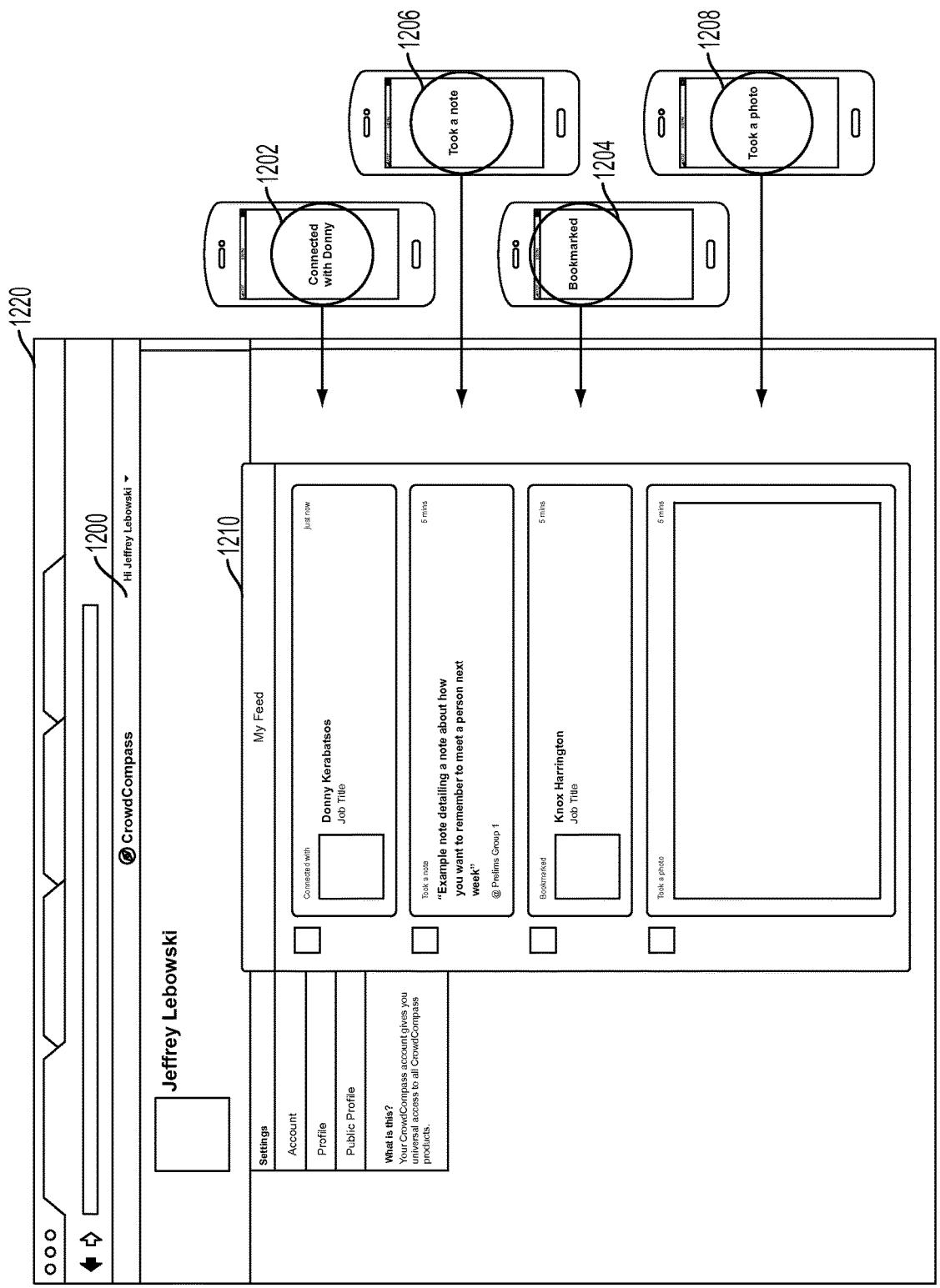

In an exemplary implementation illustrated in FIG. 11, items that are shared, such as connections 1102, bookmarks 1104, notes 1106, and photographs 1108 associated with a Compass event, appear on a user's Compass 1100 personal activity feed 1110. Exemplary FIG. 11 illustrates sharing according to exemplary embodiments of the present invention in a wireframe of a Compass on a mobile device 1120. On the other hand, exemplary FIG. 12 illustrates sharing according to exemplary embodiments of the present invention in a wireframe of a Compass on a desktop web browser 1220 where connections 1202, bookmarks 1204, notes 1206, and photographs 1208 associated with a Compass event appear on a user's Compass 1200 personal activity feed 1210.

Figure 13:
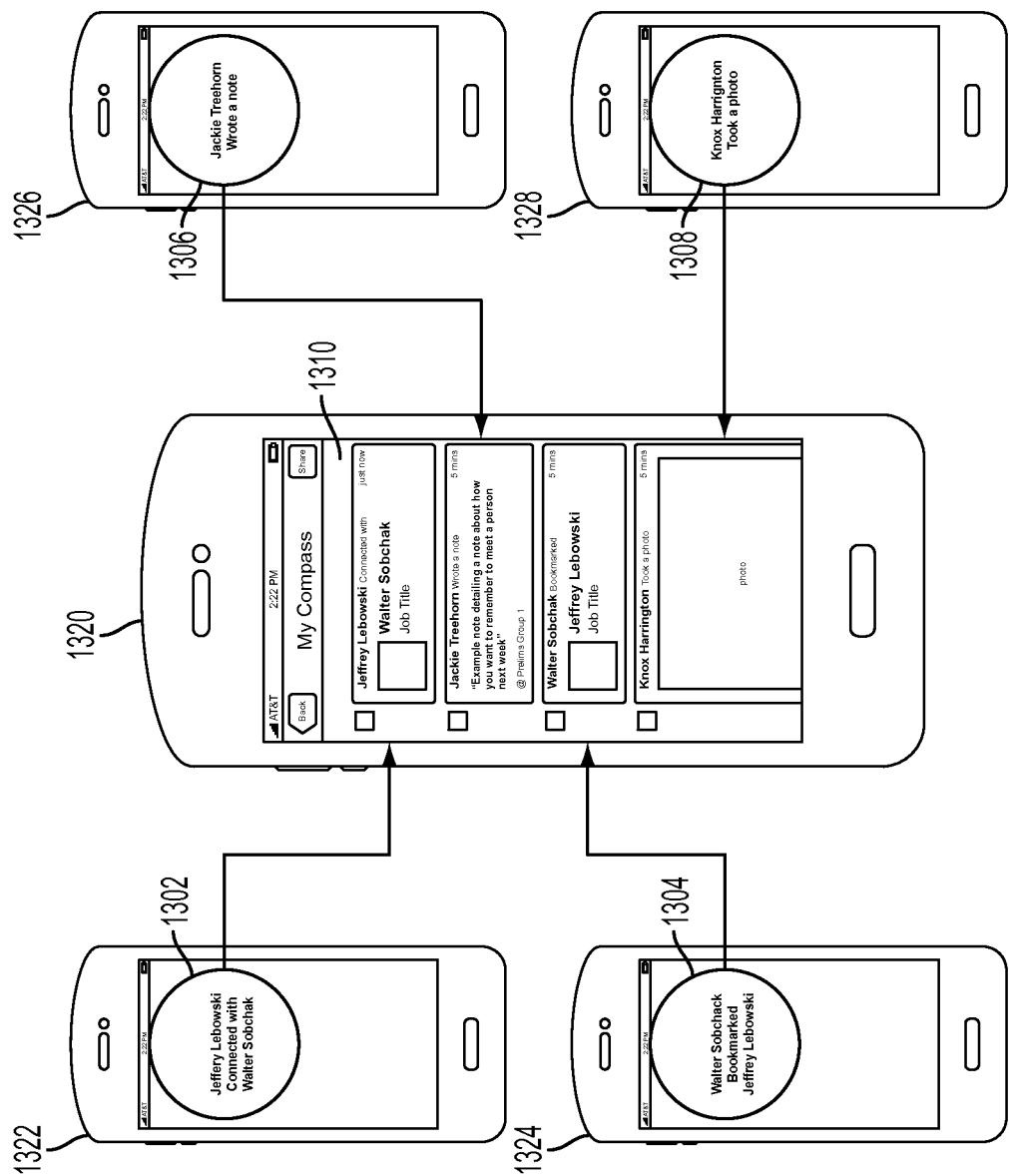
FIG. 13 shows another example of functionality, information processing and display according to an exemplary embodiment of the present invention.

In yet another exemplary implementation illustrated in FIG. 13, shared items 1302, 1304, 1306, 1308 also appear on an activity feed 1310 that is tied to a Compass event, where a personal activity feed includes all shared items for a particular attendee, and an event activity feed 1310 includes all share items 1302, 1304, 1306, 1308 across all attendees 1322, 1324, 1326, 1328 at the event.

Figure 14:
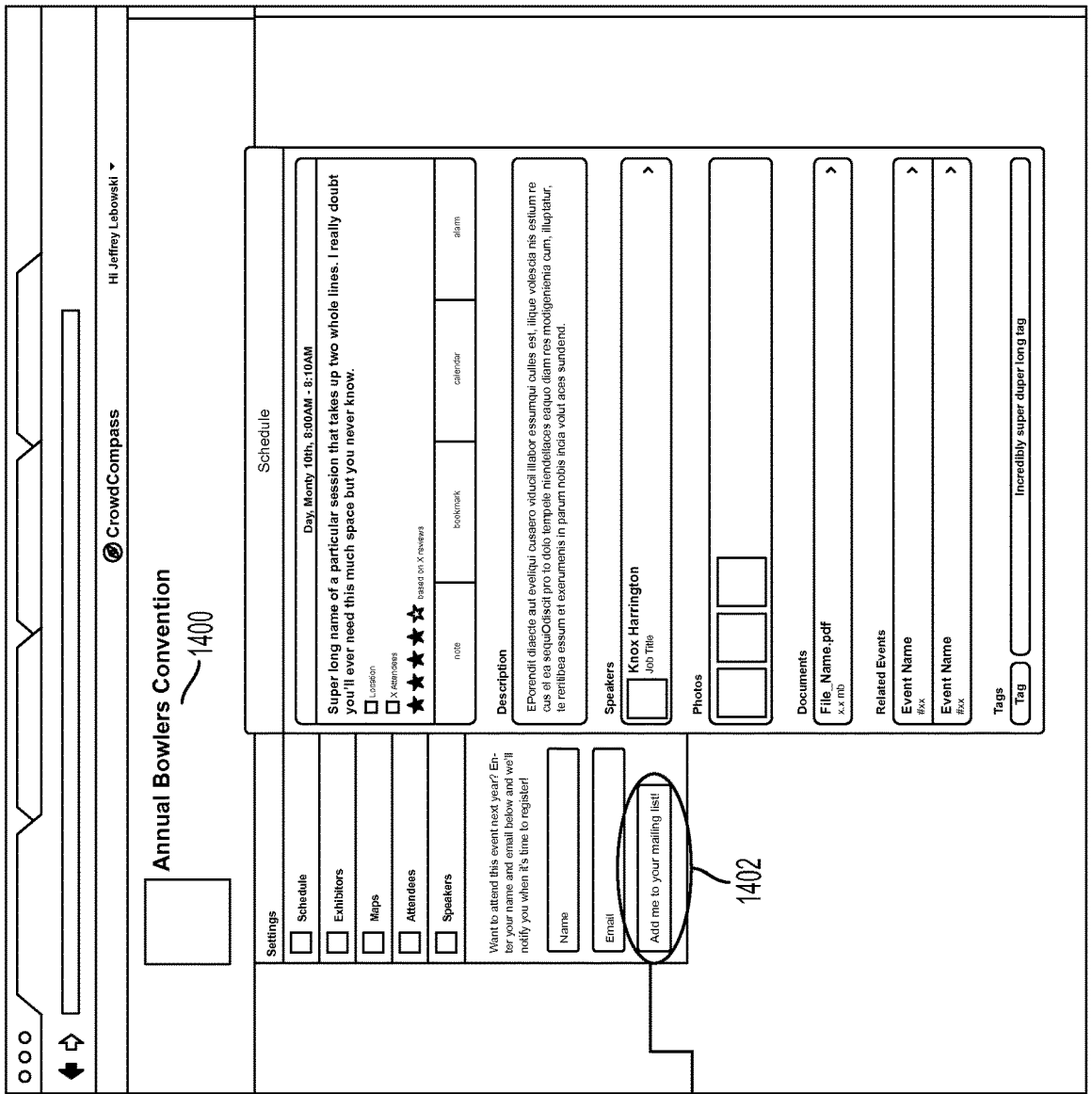
FIG. 14 shows an example of yet another feature of an exemplary embodiment of the present invention.

According to yet another exemplary implementation illustrated in FIG. 14, a Compass event 1400 can provide users an option 1402 to be reminded, for example via an email 1404, the next time registration opens for the event 1400.

Figure 15:
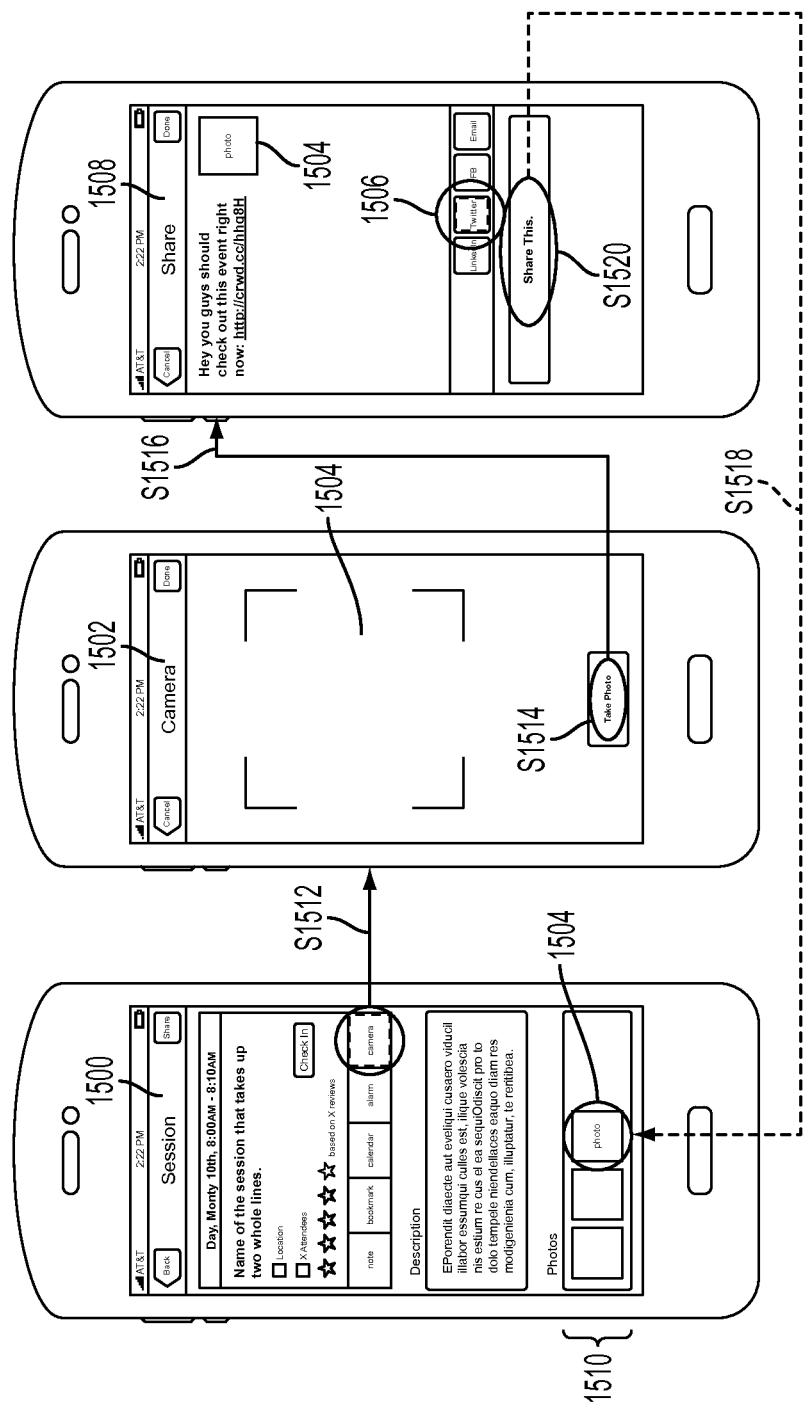
FIG. 15 shows another example of functionality and associated process flow according to an exemplary embodiment of the present invention.

According to an exemplary implementation illustrated in FIG. 15, an attendee of a session 1500 of a Compass event initiates S1512 camera 1502 to take S1514 a photograph 1504 which associates photograph 1504 with session 1500. When the attendee provides S1516 photograph 1504 to share 1508 for sharing S1520, via for example TWITTER 1506, the photograph 1504 can be automatically shared S1518 to the session's photo album 1510 for viewing by all attendees via their Compass apps.

Other examples of various implementations of exemplary embodiments of the present invention are as follows.

Figure 16A:
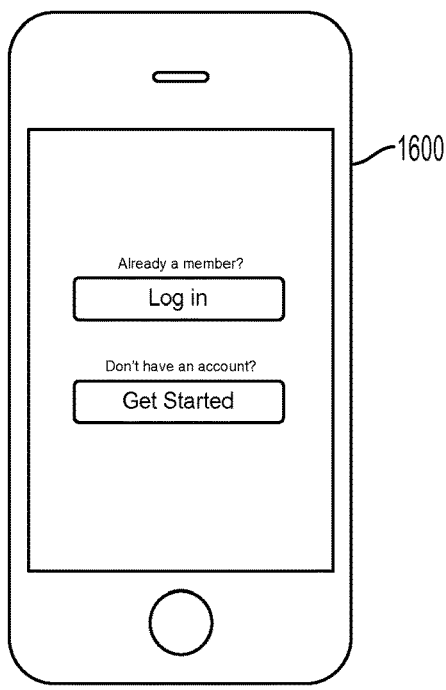
FIGS. 16A-16D show an example of functionality and associated workflow of a user of a platform according to an exemplary embodiment of the present invention.
Figure 16B:
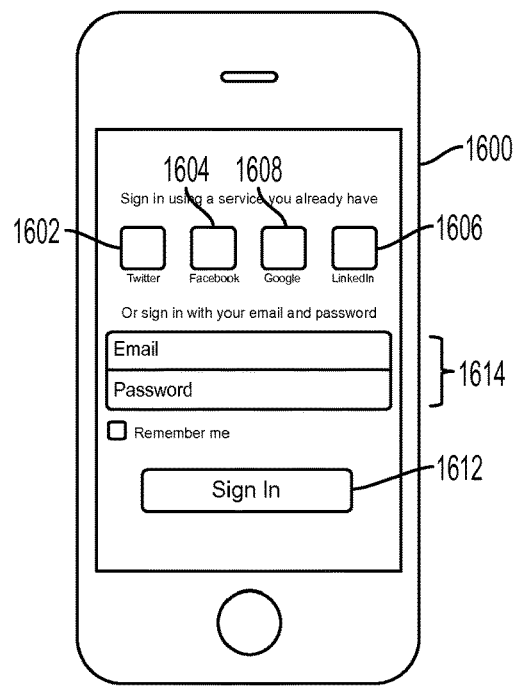
Figure 16C:
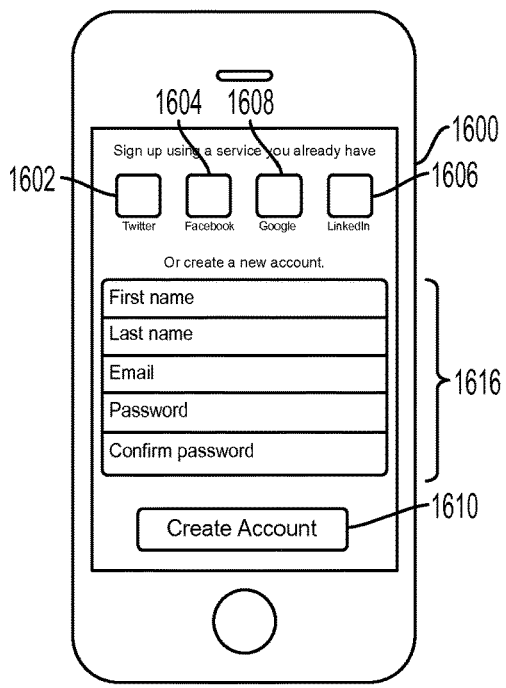
Figure 16D:
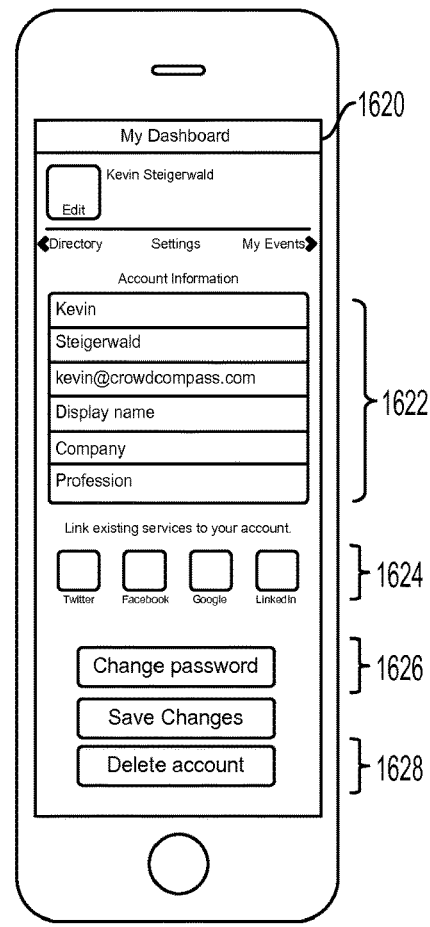
Figure 17A:
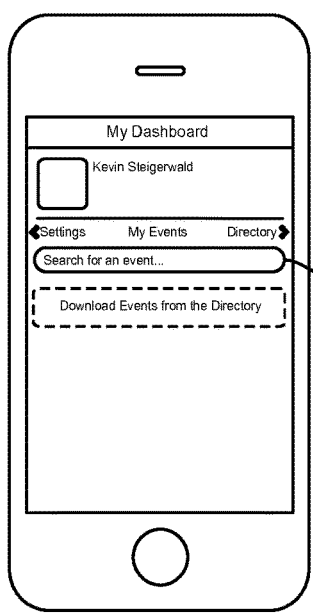
FIGS. 17A-17E show yet another example of additional functionality and associated workflow according to an exemplary embodiment of the present invention.
Figure 17B:
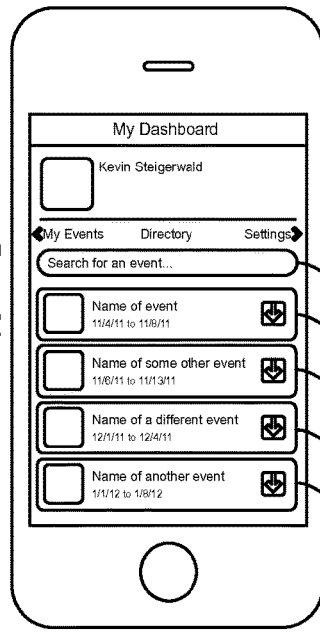
Figure 17C:
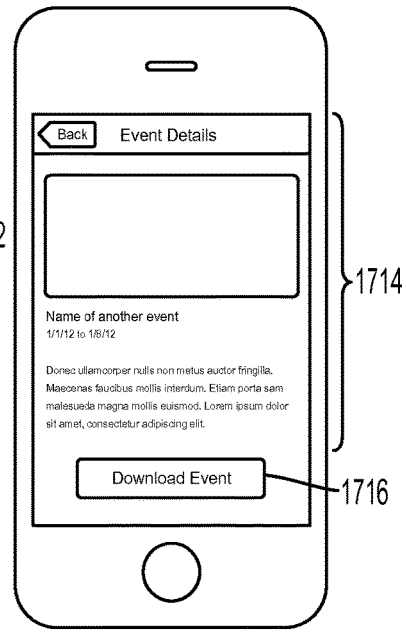
Figure 17D:
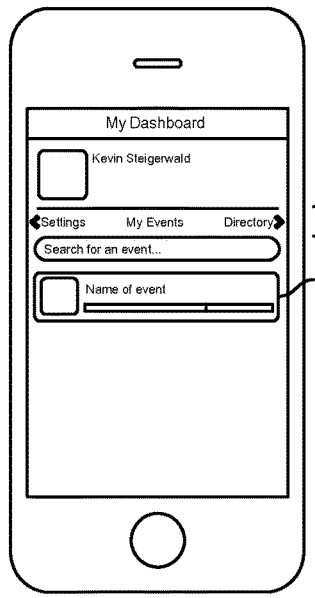
Figure 17E:
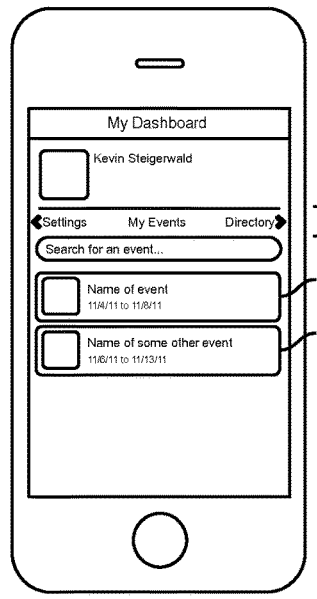

Referring to FIGS. 16A-16D, according to an exemplary implementation of the present invention the sign-in/sign-up workflow 1600, which may include providing for example general personal information and password 1616 to create a new account 1610 or sign in using general personal information and password 1614 associated with an existing account 1612, can allow Compass users to create or access a user's Compass account that is tied to any number of their social media accounts 1602, 1604, 1606, 1608. Exemplary embodiments of the present invention provide methods and systems for deploying social login 1600 (such as, for example and without limitation, TWITTER 1602, FACEBOOK 1604, LINKEDIN 1606, and/or GOOGLE 1608) for event app account creation 1610. Once the user's Compass account has been created a user can access the account settings (for example, via "My Dashboard" screen 1620 of the Compass app) to, for example, modify the settings, such as account information 1622, links to any of the user's existing services 1624, and password 1626, or delete 1628 the user's account, as illustrated in the example of FIG. 16D.

Referring to FIGS. 17A-17D, according to an exemplary implementation of the present invention, after sign-in/sign-up, a user can access Compass events which are under the user's "My Events" 1700, or selectively download event or events from Compass event directory 1702. A user can search 1704 for a desired event by, for example, event name. When one or more events 1706, 1708, 1710, 1712 from Compass event directory 1702 are available for access by the user, the user can selectively review an event's detailed information 1714, and can selectively download 1716 an event 1718, or multiple events 1718, 1720 into the user's Compass (under "My Events" 1700).

Figure 18A:
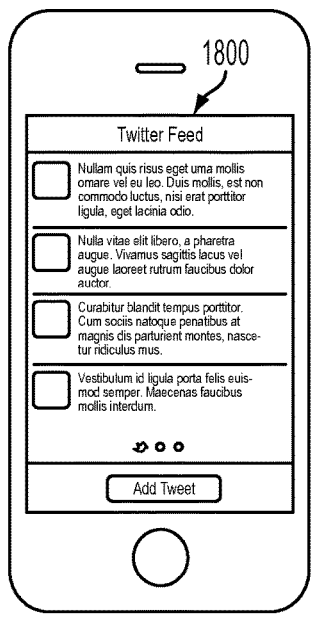
FIGS. 18A and 18B shows an example of another feature and associated additional functionality selectively provided by the feature according to an exemplary embodiment of the present invention.

Referring to FIG. 18A, according to an exemplary implementation of embodiments of the present invention, the app allows 1800 users to view and/or add 1832 comments 1830 about a Compass event.

Figure 20A:
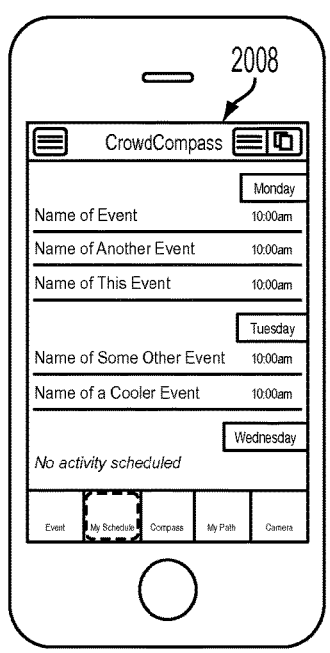
Figure 20B:
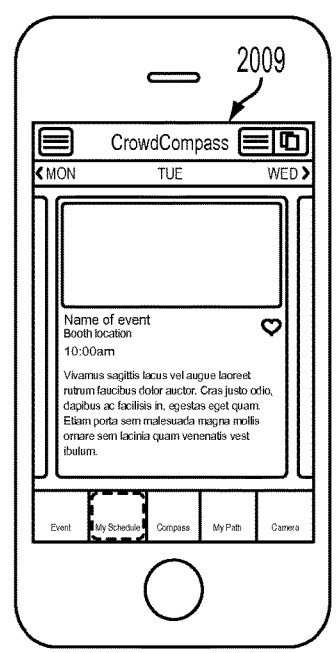
Figure 20C:
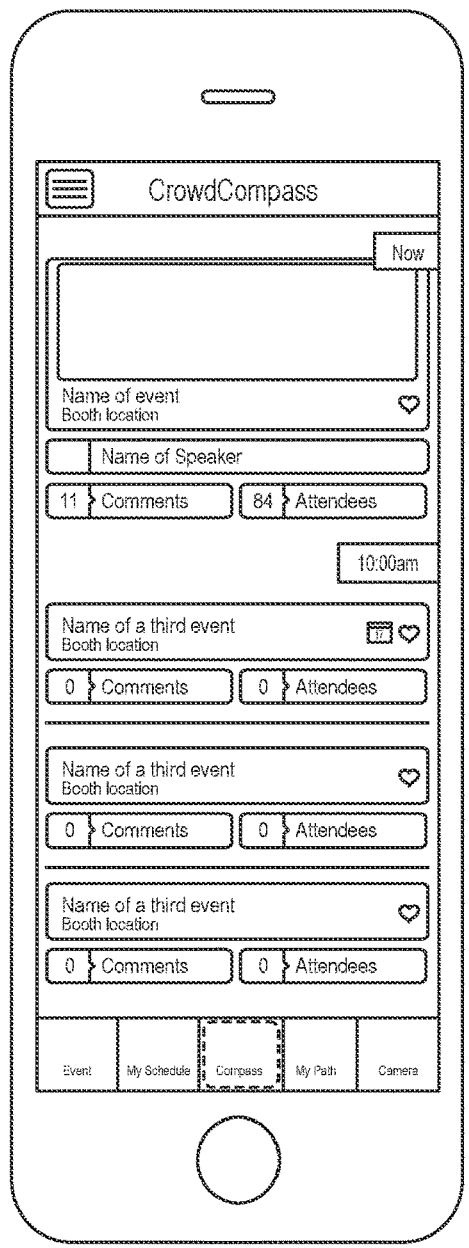
Figure 20D:
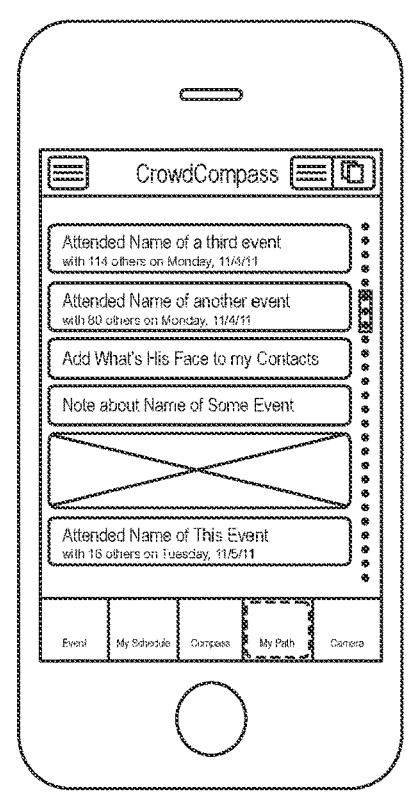
Figure 20E:
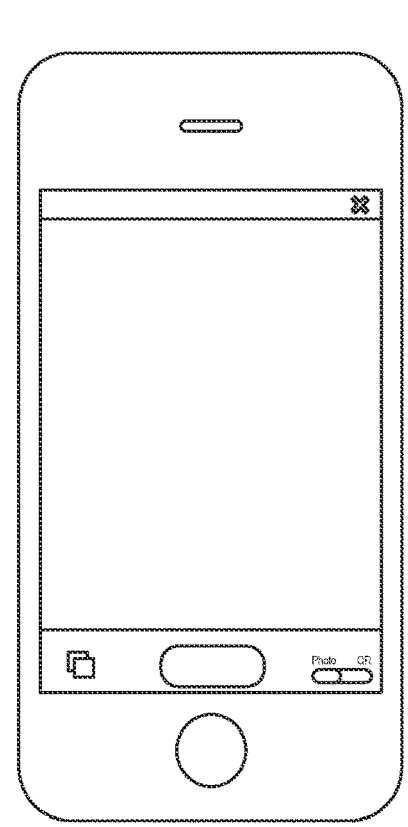

Referring to FIGS. 18B, 20A-20D, and 20F, according to an exemplary implementation of embodiments of the present invention, the app allows 1801 users to selectively perform various functions 1802 in association with a Compass event or events. In the example of FIG. 18, these functions provide, without limitation, access to: Compass event information 1806; user's schedule 1808 (see FIGS. 20A and 20B illustrating an example of additional functionality 2008, 2009 provided when accessing user's schedule); Compass event listing 1810 (see FIG. 20C illustrating an example of additional functionality 2010 provided when accessing Compass event listing); user's information or "path" associated with Compass events 1812 (see FIG. 20D illustrating an example of additional functionality 2012 provided when accessing a user's path), and native camera application 1814 for taking photographs that can be associated with an event (see FIG. 20F illustrating an example of functionality 2014 provided when accessing camera application).

Figure 18B:
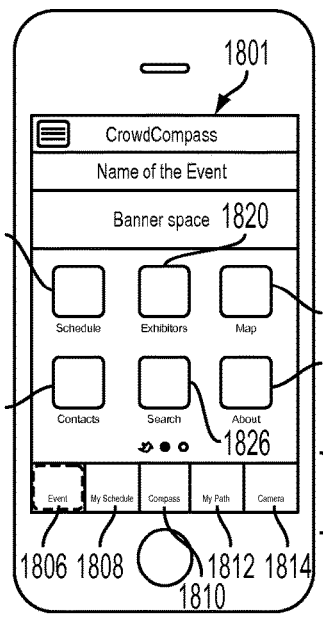
Figure 19A:
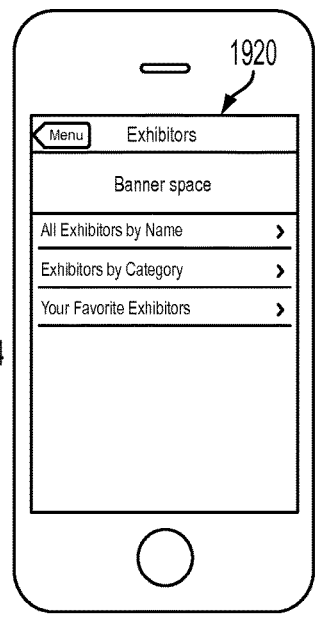
FIGS. 19A-19B and 20A-20E show examples of additional features and associated additional functionality selectively provided by the features of FIG. 18B according to exemplary embodiments of the present invention.
Figure 19B:
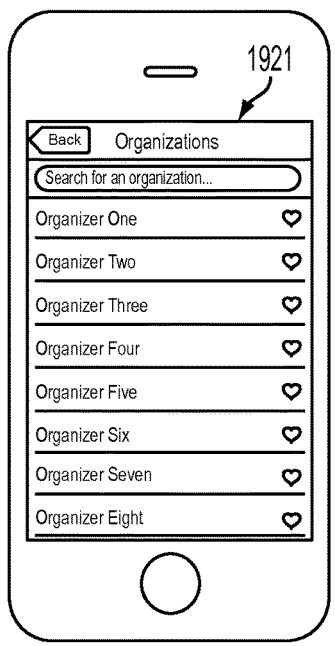

Referring further to FIG. 18B, as well as FIGS. 19A and 19B, according to an exemplary implementation selection, accessing user's schedule 1806 provides additional functionality 1804 allowing user to electively access, display and/or manipulate specific information associated with an event including, without limitation: event schedule 1818, event exhibitors 1820, event maps 1822, event contacts 1824, event search 1826, information about event 1828. In another exemplary implementation selectively accessing additional functionality 1804, such as even exhibitors 1820, can provide user not only access to underlying more specific event information, but also further functionality, such as list menus 1920 and 1921 associated with the specific event information (exhibitors 1820 in the example of FIGS. 19A and 19B).

According to an exemplary embodiment of the present invention, a single user account ("My Compass") can exist for any users (such users may include, without limitation, event planners, exhibitors, speakers, attendees, or any other individuals or groups associated with an event) of the system. According to such an exemplary implementation, a given user can be allowed to collect digital reputation and experience across any of the Compass events.

According to exemplary implementations of embodiments of the present invention, once the users have signed in or signed up for a Compass account, then the users can keep track of and/or share their interactions at the event using various tools of the Compass app which allow users, without limitation:

Download event information for one or more events from a directory proved by a Compass server, as illustrated in the example of FIGS. 17A-17E.

Figure 23:
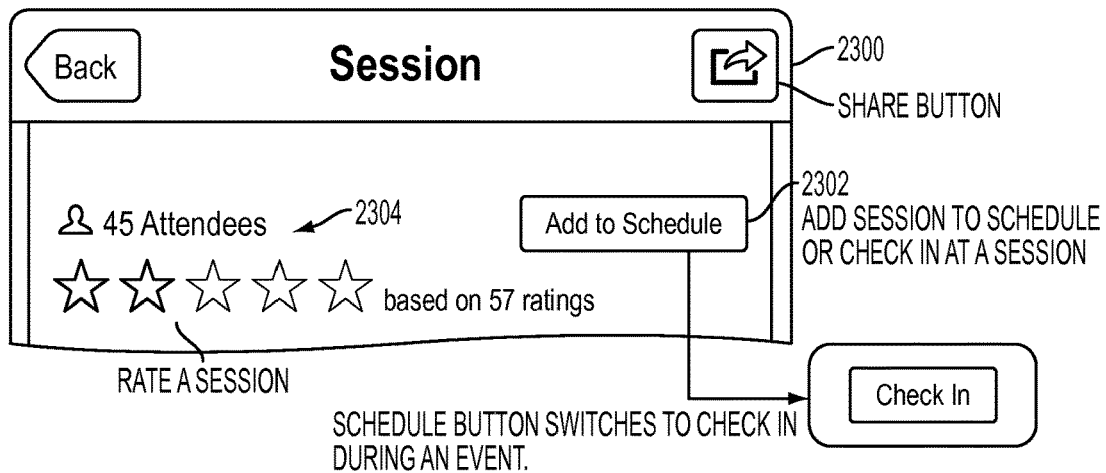
FIGS. 23-31 show further examples of features and associated functionality selectively provided by exemplary embodiments of the present invention.

Add a session (or an event) 2302 to their schedule, and/or rate 2304 a session, as illustrated in the example of FIG. 23.

Figure 24:
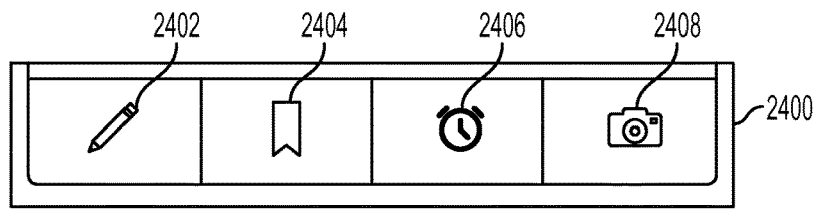

Bookmark 2404 a session, exhibitor, speaker, location, product, as illustrated in the example of FIG. 24.

Figure 25:
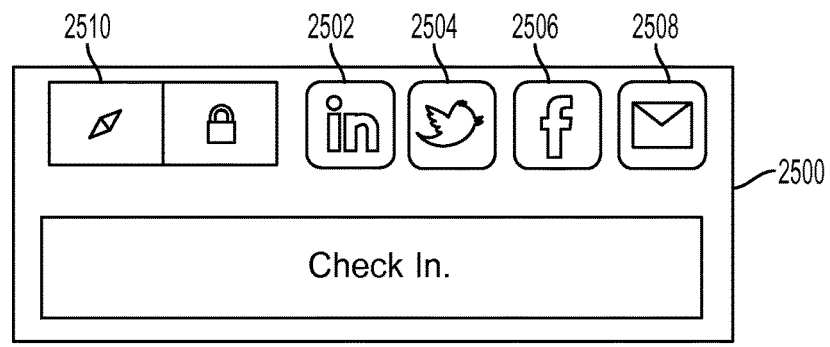

Select sharing options, as illustrated in the example of FIG. 25.

Figure 26:
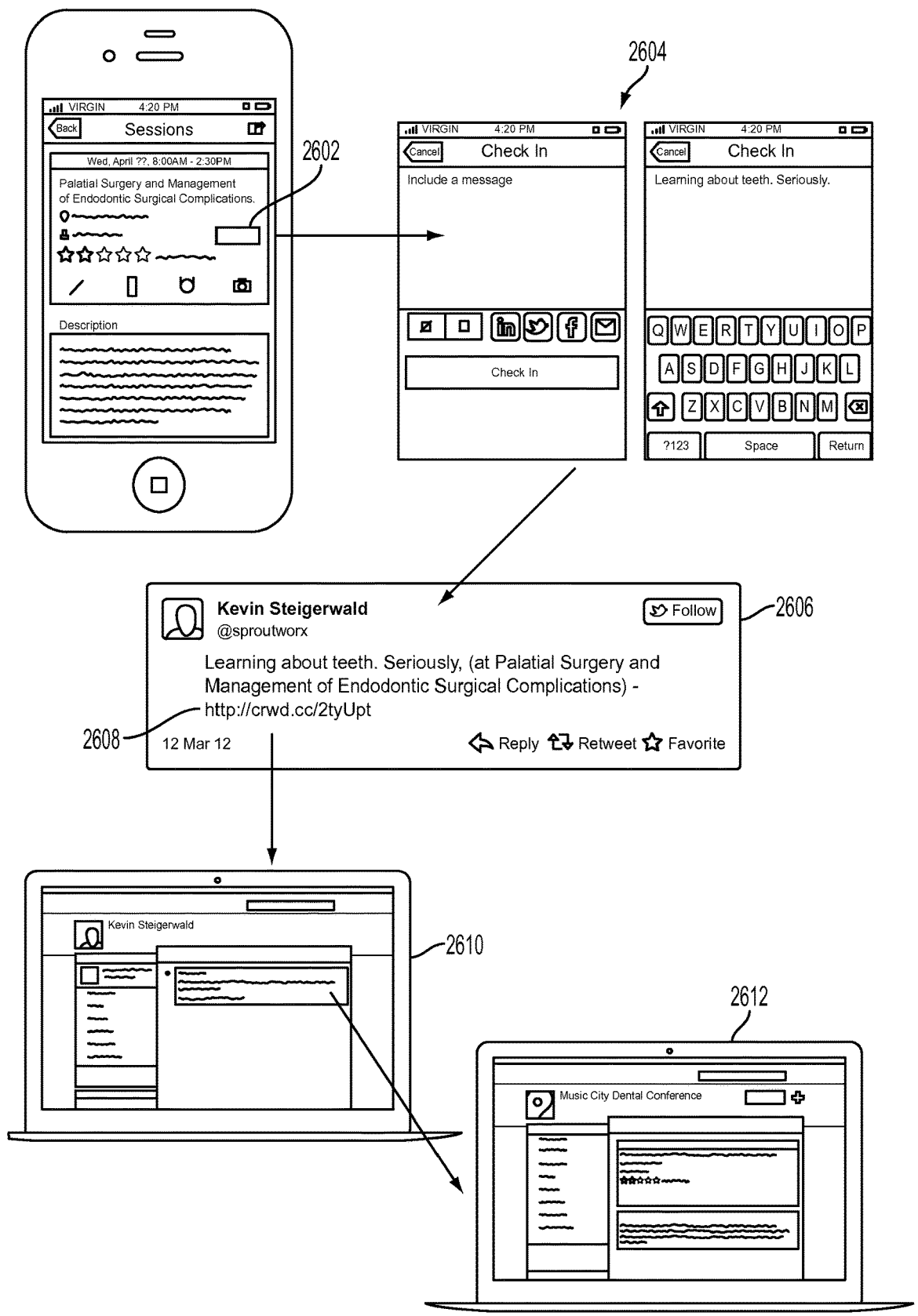

Check into a session, as illustrated in the example of FIG. 26.

Figure 27:
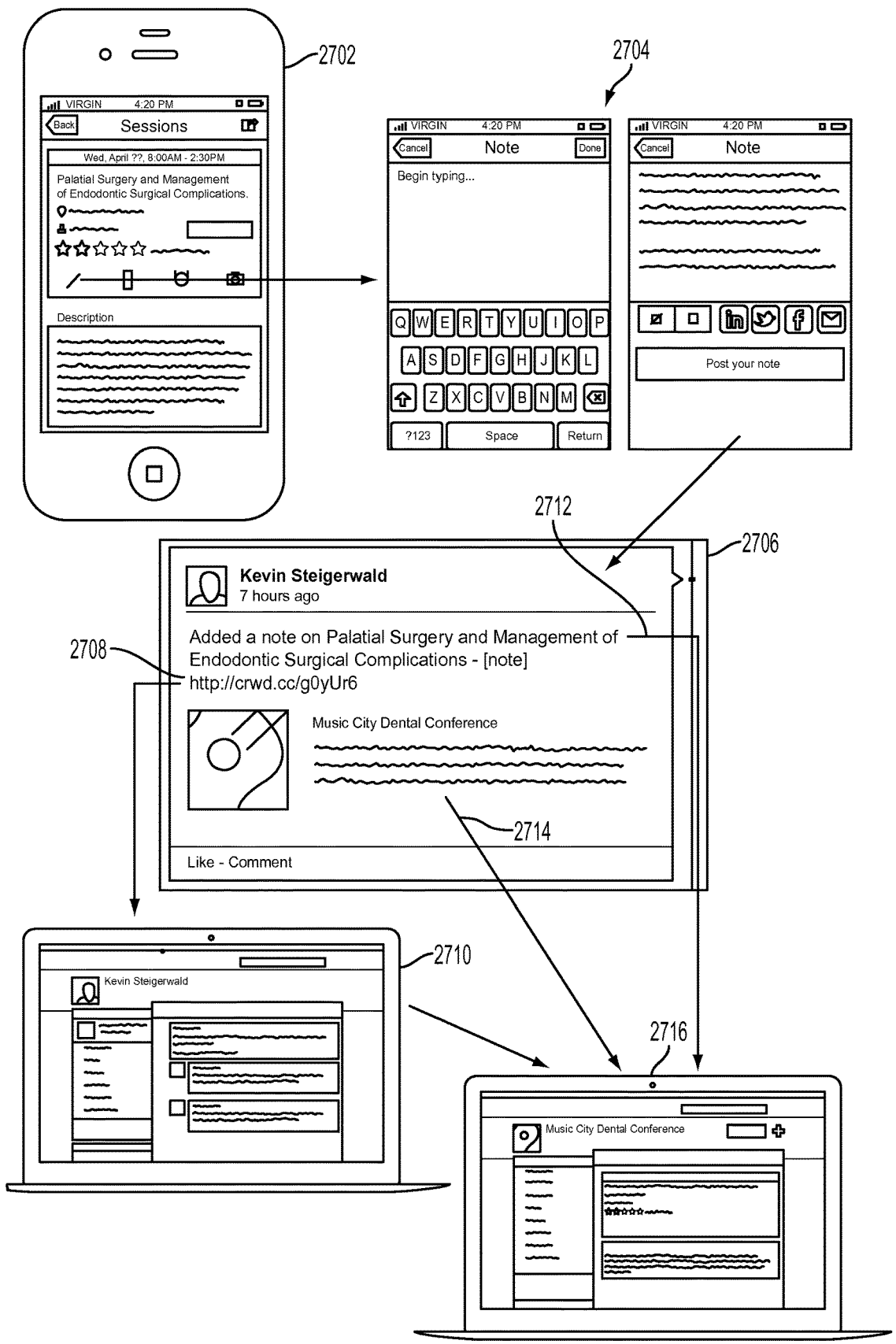

Take a note (on a session, exhibitor, speaker, location, product), as illustrated in the example of FIG. 27.

Figure 28:
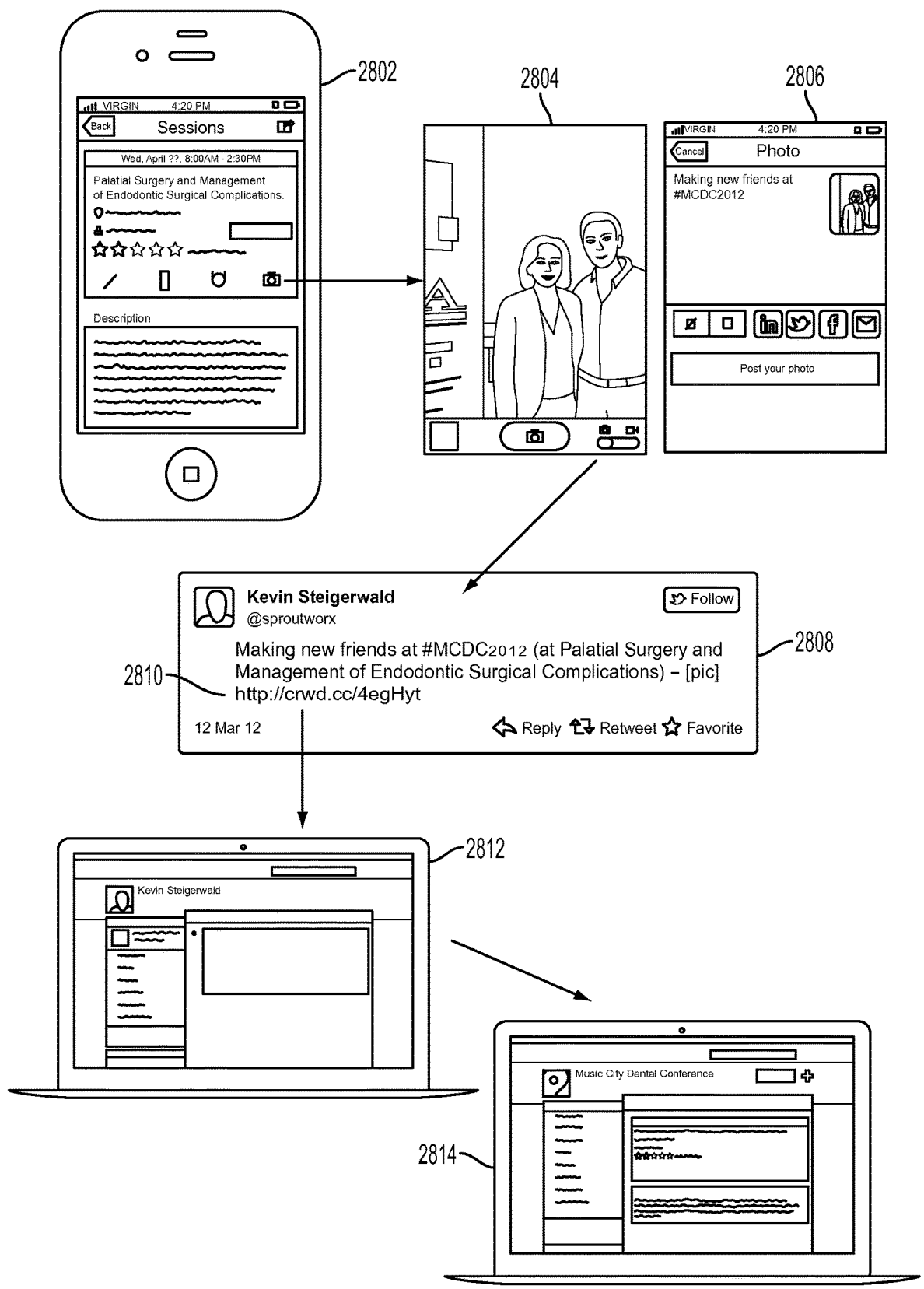

Take and post a photograph, as illustrated in the example of FIG. 28.

Figure 29:
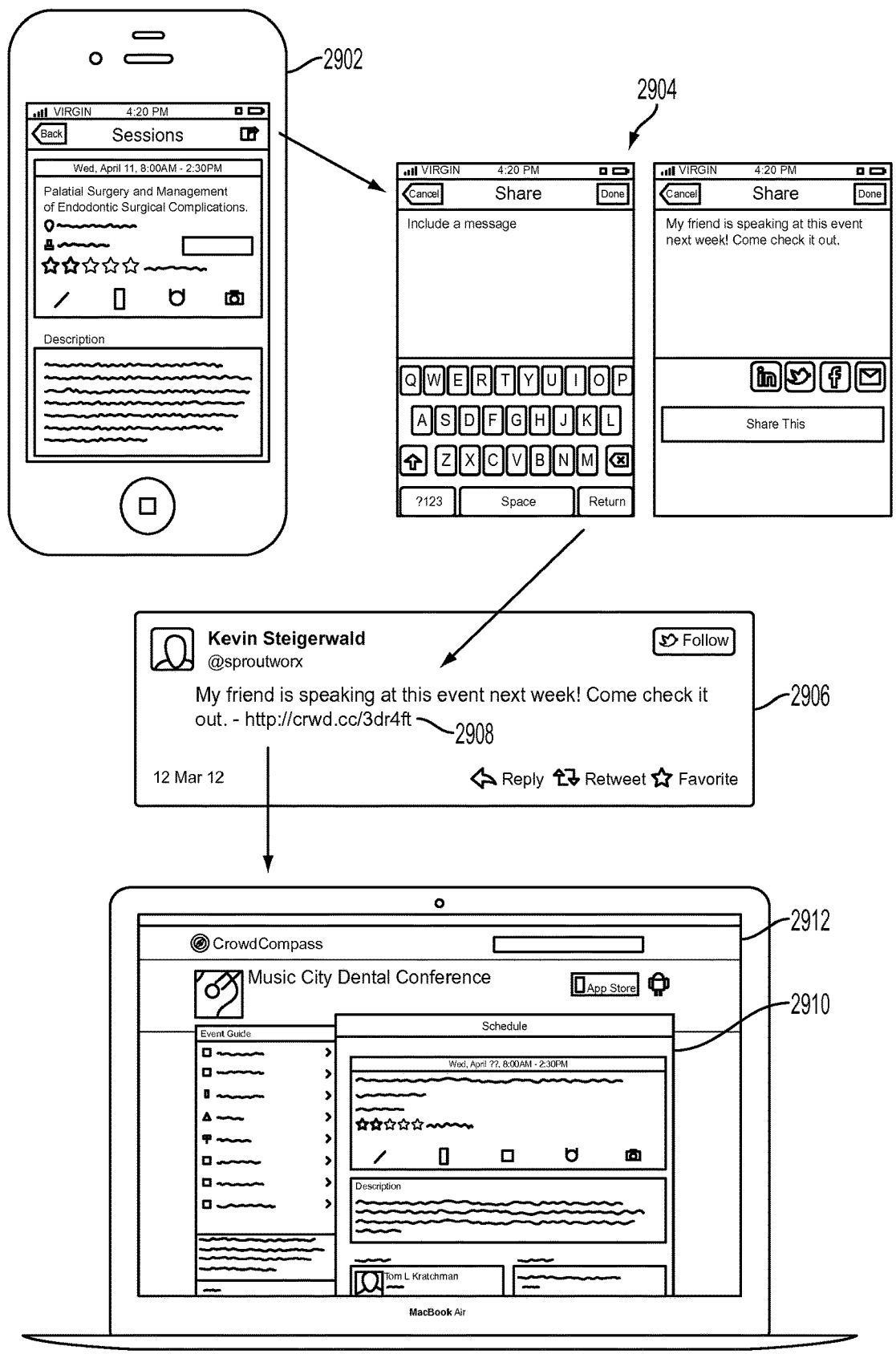

Share a detailed view, as illustrated in the example of FIG. 29.

Figure 30:
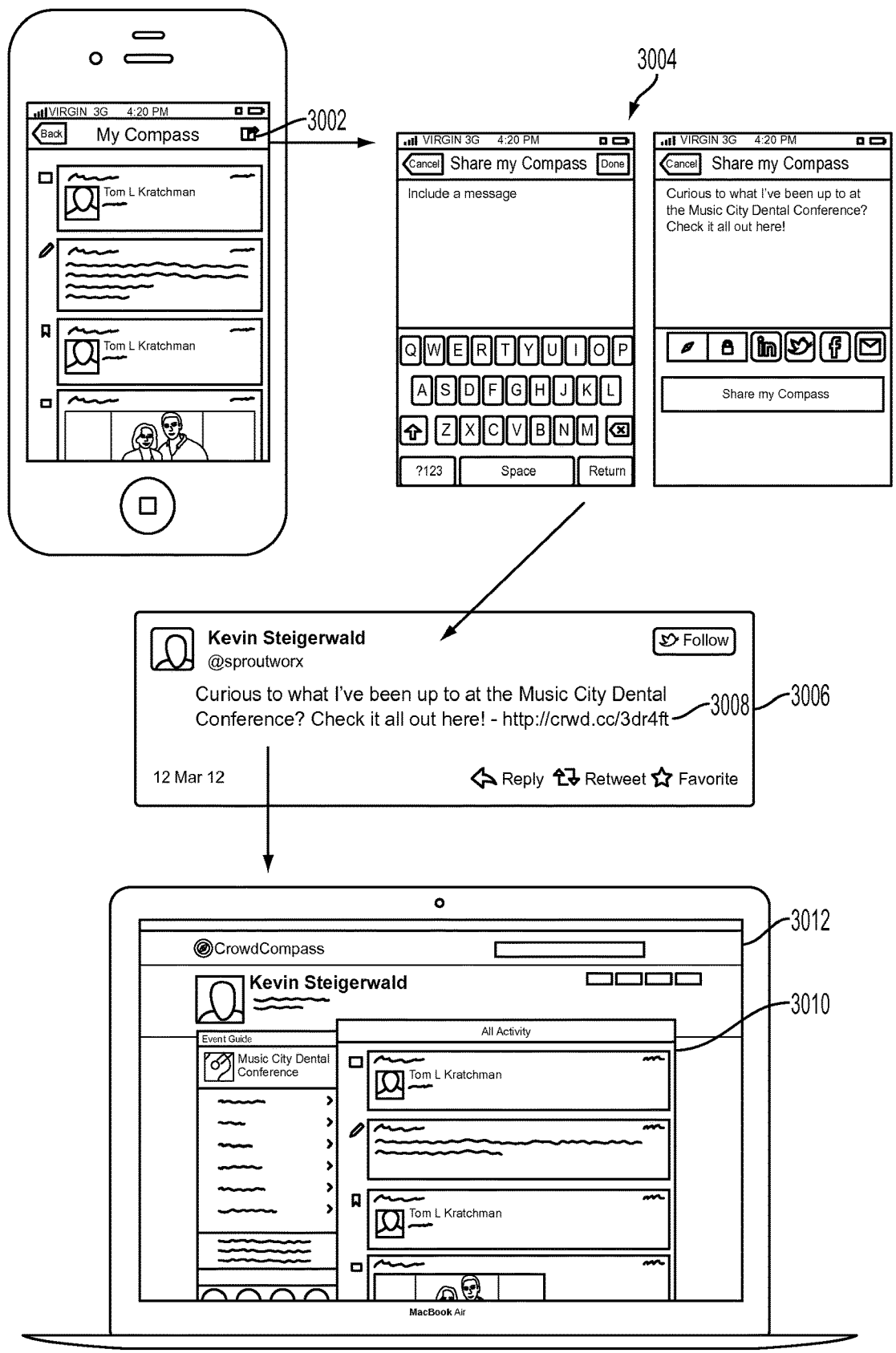

Share entire activity feed, as illustrated in the example of FIG. 30.

Figure 31:
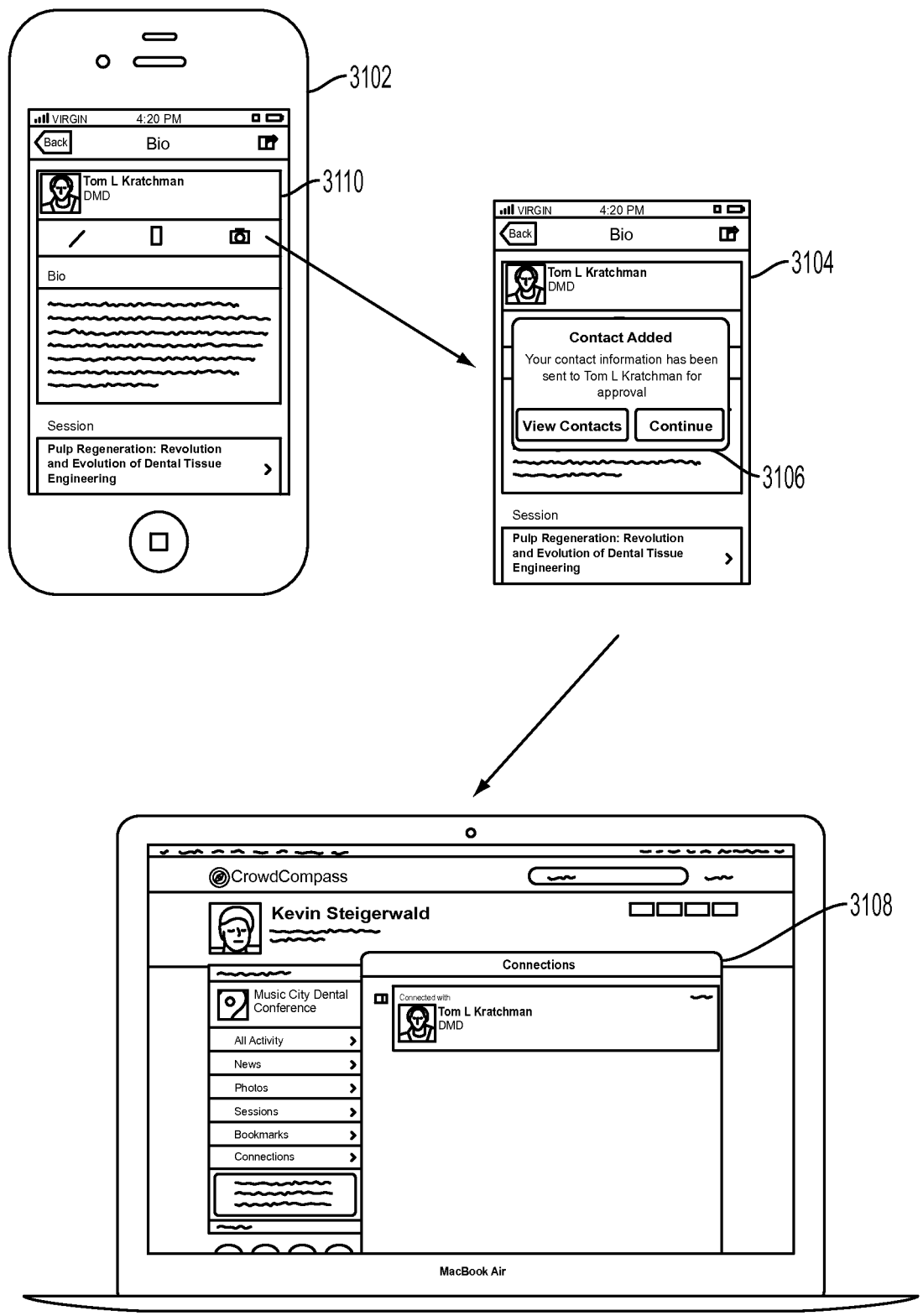

Add a contact, as illustrated in the example of FIG. 31.

When the users have their Compass setting turned on (for example, as a default), the mobile and web applications can automatically post this activity to users' personal activity feed for the event—a user's Compass. In an exemplary implementation, this would require no additional action on behalf of a user.

Referring to FIGS. 23-25, according to an exemplary implementation of an embodiment of the present invention, the Compass provides 2300 detail pages associated with an event, including without limitation detailed pages for speakers, sessions, organizations and attendees. The Compass also provides selectable actions, such as create a note 2402 about a session, speaker, organization, or attendee, bookmark 2404 a session, speaker, organization, or attendee, set a reminder 2406 (for example, a reminder for a session only where reminders do not appear on a user's Compass), and add a photo 2408 to a session's album (for example, a for a session only). These selectable actions 2402, 2404, 2406, and 2408 can be accessible via a menu bar 2400, and associated with event information on detailed pages. The actions performed by user can be recorded to the user's Compass, and the user has the ability, via a menu bar 2500, to share 2502, 2504, 2506, and 2508 one or more of their actions with the user's social network of choice. In an exemplary implementation, a user has an option 2510, for example by a slider action, to maintain a selected information private such that the selected information can be displayed in a user's app (user's Compass), but visible only to the user when the user is logged on.

Referring to FIG. 26, in an exemplary implementation, when a Compass user attends an event associated with Compass, or a session of an event, the user can check into a session 2602 and, for example, include a message about the session to push out to user's Compass 2604 and/or any or all of user's social networks 2606, such as TWITTER. In another exemplary implementation, information included with a user's message can provide a link 2608 (such as a direct link) to a posting on the user's Compass 2610, where other Compass users can leave comments if they are logged on. In yet another exemplary implementation, the other logged in Compass users can be allowed to have access the rest of user's Compass 2610, where from the user's Compass the other Compass users can, for example, click through the full session and explore the rest of the information about the event through a web version of an event guide 2612 which may be provided by the Compass server.

Referring to FIG. 27, in an exemplary implementation, when a Compass user attends an event associated with Compass, or a session of an event, 2702 the user can take notes 2704 on any or all detail views 2702 (such as sessions, attendees, organizations, and/or speakers) on any event, or session of an event, provided by Compass server. In another exemplary implementation, for example, notes 2704 can be selectively shared or kept private by the Compass user. When sharing notes, the Compass user can push the notes out to any or all of the user's social networks 2706, such as FACEBOOK. In another exemplary implementation, when sharing notes a user can include a link 2708 (such as a direct link) to a user's Compass 2710 from which the other Compass users can navigate to the event information which may be provided 2716 by the Compass server. In yet another exemplary implementation, when sharing notes, information can include additional links, such as a direct link to a web version of an event guide 2714, or a direct link to a web version of the specific session of the event 2712, where the web versions may be provided 2716 by the Compass server.

Referring to FIG. 28, in an exemplary implementation, when a Compass user attends an event associated with Compass, or a session of an event, 2802 the user can take photographs (using a native photo app 2804 of the user's device) to push out to user's Compass 2806 and/or any or all of user's social networks 2808. In another exemplary implementation, information included with a user's photograph can provide a link 2810 (such as a direct link) to the user's Compass 2812. In yet another exemplary implementation, the other logged in Compass users can navigate from the user's Compass 2812 to the rest of the information about the event through a web version of an event guide 2814 which may be provided by the Compass server.

Referring to FIG. 29, in an exemplary implementation, when a Compass user attends an event associated with Compass, or a session of an event, 2902 the user can selectively share 2904 specific information, including without limitation detailed pages for speakers, sessions, organizations, and/or attendees, associated with the Compass event. When sharing the information associated with the Compass event, the Compass user can push out to the user's social network 2906 a direct link 2908 to the specific information, for example a session, 2910, of a web version of an event guide 2912 which may be provided by the Compass server. In yet another exemplary implementation, after accessing the specific information 2910, the other logged in Compass users can navigate to the rest of the information about the event through a web version of an event guide 2912 which may be provided by the Compass server.

Referring to FIG. 30, in an exemplary implementation, when a Compass user attends an event associated with Compass, or a session of an event, the user can share 3004 their entire activity feed (my Compass) 3002 associated with the Compass event. When sharing the entire feed, a Compass user can push out to the user's social network 3006 information including a direct link 3008 to the user's activity feed 3010 associated with the Compass event which may be provided as a web version 3012 by the Compass server.

Referring to FIG. 31, in an exemplary implementation, when a Compass user attends an event associated with Compass, or a session of an event, 3102 the user can selectively add 3104 another Compass user 3110 as contact. In in exemplary implementation, adding a contact can be considered as contact information sharing between a first and a second Compass user governed by privacy control that the first and second users have on their respective Compass. For example, if both first and second users' Compass accounts are set as public, the information can be shared mutually, with the second user receiving a notification when the first user has added the second user as a contact. In another example, if both the first and second users' Compass accounts are set to private, or if the initiator (e.g., first user) is public and the second user is private, then the initiator's information is sent to the contact (e.g., second user), the initiator will receive a notification 3106, and the second user with receive a notification to approve the contact, which if approved will send the contact's (e.g., second user) information back to the initiator. Once the mutual connection is made, it appears in the connections 3108 of both users' Compasses.

Yet further exemplary implementations of the embodiments of present invention provide other features as described in the examples below.

According to an exemplary implementation, as Compass users sign-up/sign-in to events, they can be creating their own Compass pages for each individual event they are attending. Badges from each associated event (for example, a conference) can be displayed on their personal profile and can serve as digital reputation for having attended that event.

In yet another exemplary implementation, each badge on a user's personal profile can represent an event attended. According to a yet further exemplary implementation, a feature of drilling down can reveal more personal event detail—a so called user's Compass activity feed.

According to yet another exemplary implementation, a Compass can serve as an event app with personal activity feeds that can be collected through passive sharing and associated to global user profiles—all related to an event-going experience.

According to yet another exemplary implementation, a Compass can serve as an event solutions provider that has digital reputation (badges and activity feed counts) visible across all events attended—at the user level.

According to yet another exemplary implementation, a Compass user can have his or her own activity feed for each event and can easily share a simple short url via an email, SMS, and/or traditional social networks (TWITTER, FACEBOOK, LINKEDIN, GOOGLE), and the like.

Exemplary potential benefit of such an implementation include, without limitation, creating engaging experiences and capturing the attention of those not at the event.

According to another exemplary implementation, a Compass can offer a "remind me next time" button on an individual's Compass feed that allows a visitor to simply click and express interest in the next event even though the event does not exist yet.

According to yet further exemplary implementation, CrowdCompass can deliver the list of interested prospects to the event organizer and inform the interested prospect of the event when it goes live.

As described above with reference to FIGS. 4A and 4B, according to an exemplary implementation, CrowdCompass can offer "multi-event" apps where an application exists to contain a list and/or a directory of events. Yet another exemplary feature according to such an implementation allows users to download or otherwise drill down into the details of each event.

According to yet further exemplary implementation, events may exist in one or more apps (for example, for cross-promotion efforts) simultaneously.

Still other exemplary implementations or variations of the embodiments of the present invention are described in the following examples.

Private Events

According to an exemplary implementation, CrowdCompass can offer a feature of making an event private, so that it does not show up in, for example, an Event Directory List. The user of a multi-event app can then enter a private code which can automatically reveal the private event in the event list.

According to yet another exemplary implementation, users that are signed in (into a CrowdCompass account) and are pre-registered for the private events can see those private events exposed in the list without having to provide a code.

On-Device Preview

According to an exemplary implementation, certain CrowdCompass single user account, such as event organizers (for example, administrators), that are logged into the mobile apps can be given capability to see any in-progress events in their event directory. In an exemplary implementation, such a feature can allow event organizers to preview changes and settings to their events on native mobile applications and the web before the event is published.

Real-Time Event Activity Feed

According to an exemplary implementation, an event activity feed is available, displaying in real-time select (or all) content compiled from activity feeds of all (or a subset of) users at the event. The event activity feed may be viewed for example by an individual through a web browser, mobile device, or projected on a large screen or monitor at the event. The content of the page updates in real time as users share content related to the event, and is available for viewing at any time before, during, and after the event.

Mobile Client Error Handling and Fail Over

Network unavailability is common and intermittent and the mobile clients can be designed accordingly. According to an exemplary implementation, given that the mobile clients already tolerate network unavailability and outages, any CrowdCompass server-side outages leave the end-user in a highly functional state.

According to another exemplary implementation, runtime errors on the client can be logged locally and reported via email and web portals. Web service errors encountered by the client can be logged via HTTP to a notification service. In the event of server overcapacity or outage, a new application stack can be spun up (for example, Chef-script managed) in the same or different data center and the Domain Name System (DNS) can be repointed. The DNS and server infrastructure can be hosted on separate providers. Redundancy can be added to the system to further increase reliability.

Application Programing Interface (API)

According to an exemplary implementation, CrowdCompass can offer an Affiliate, or Partner, API. All API calls can be made over HTTPS using and authenticated key issued by CrowdCompass. The API can offer an improvement versus traditional data loading for real-time data feeds to the Event Center and subsequently to the mobile clients via the synchronization engine. The Crowd Compass Affiliate API can offer further benefits by being closely tied to the Event Center synchronization engine and using the synchronization strategy—providing the necessary meta information required by the mobile devices.

Event Center

According to an exemplary implementation, Event Center can be a main content entry and management tool of the Crowd Compass system. API data and comma-separated-value (CSV) data is fed into the system allowing further manual updates. Event Center can offer a custom username/password authentication model. In another exemplary implementation, development Event Center can extend and redefines this to include full OAuth authentication. In the development environment, TWITTER, FACEBOOK, LINKEDIN and other providers may be used for authentication in addition to the Crowd Compass OAuth login.

Exhibitor Center

According to an exemplary implementation, Exhibitor Center can be an extension of the Event Center and allow for content-entry by an authenticated exhibitor user. Pre-authenticated URLs can be sent by an event organizer, through for example automated emails, to the event exhibitors. Exhibitors can then open their account, define a password, and directly enter information for the event. Additionally, exhibitors can choose to upgrade and provide enhanced, rich content for their listing.

Speaker Center

According to an exemplary implementation, similar to Exhibitor Center, Speaker Center can offer speakers an opportunity to edit and expand their profiles while providing another hands-free tool for event organizers.

Attendee Center

According to an exemplary implementation, Attendee Center can be an extension of Event Center offering a web interface for desktop and unsupported device users. All event—schedule and exhibitor (sponsor)—information can be made available. Mobile usability of the Attendee Center and the degree of personalization (personal schedules, meetings, favorites, ratings) available can be expanded and deployed as desired.

Technology

According to an exemplary implementation, Crowd Compass Event Center (Content Management System, CMS), Exhibitor Center, and Attendee Center can be deployed as part of the overall system to drive content and extend the experience beyond the native mobile clients.

According to an exemplary implementation, Crowd Compass applications can be built on, for example, a Ruby on Rails (RoR) application stack with additional key components (such as and without limitation, RabbitMQ, ejabberd—both erlang, MongoDB) deployed for specific tasks (such as and without limitation queuing, messaging, logging, respectively).

Native Client Build Infrastructure

According to an exemplary implementation, tools (such as and without limitation, Apache Ant, Ruby, Java) scripts can be used to extract information from Event Center for an event and packaged into mobile databases (such as and without limitation, sqlite3) and asset (such as and without limitation, maps and images) collections (such as and without limitation, zip).

According to an exemplary implementation, an interface to the build process can be offered by a continuous integration and build server allowing for scalable, distributed (master-slave) builds and cross-platform availability. The build infrastructure can be stateless and can be scaled horizontally. Builds can be saved, for example to the cloud via Dropbox, and available for simulation (demos) and over-the-air (OTA) install internally.

The above-described exemplary embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and so on, including a carrier wave transmitting signals specifying the program instructions, data structures, and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

While the present invention has been shown and described with reference to certain exemplary embodiments thereof, it will be understood by those skilled in the art that various changes in form and details may be made therein without departing from the spirit and scope of the present invention as defined by the appended claims.

We claim:

1. A method for gathering and distributing information associated with an event, the method comprising:
    automatically synchronizing a mobile or web-based application with a schedule of sessions at an event, said event comprising said sessions, when initiating said mobile or web-based application on a user device upon registration for said event, said synchronizing comprising assigning a unique session identifier to at least one of said sessions based on said schedule;
    configuring said application to
        accept a plurality of user inputs, and
        automatically associate at least one of said inputs with said at least one of said sessions at said event according to said schedule of said sessions at said event based on said unique session identifier of said at least one of said sessions;
    selectively combining at least a portion of said automatically associated user inputs into information forming a user activity feed for said at least one of said sessions at said event;
    organizing said user inputs into pages for said event;
    displaying a user's digital reputation associated with said event; and
    selectively transmitting at least a portion of said information forming said user activity feed to at least one of
        a user's social media account not associated with said event, a content management system associated with said event; and at least one other mobile or web-based application.

2. The method of claim 1, wherein said selectively transmitting to said at least one other mobile or web-based application comprises at least one of broadcasting, multicasting, and unicasting said information to selected individual user, a group of users, or groups of users accessing said at least one mobile or web-based application, and
    wherein said mobile or web-based application is platform-independent.

3. The method of claim 1, wherein said selectively transmitting to said at least one other mobile or web-based application comprises broadcasting or unicasting said information to a plurality of mobile or web-based applications, and
    wherein said mobile or web-based applications are platform-independent.

4. The method of claim 1, wherein said application provides login access to at least one social media account allowing a user of said application to associate said at least one social media account with said application, and
    said selectively transmitting to said at least one other mobile or web-based application comprises at least one of broadcasting, multicasting, and unicasting said information via said at least one social media account.

5. The method of claim 4, wherein said social media account comprises at least one of email, text messaging, and other communication media account supporting at least one of data transfer and sharing between users.

6. The method of claim 1, wherein said application is configured to accept a single user account for any users and to authorize any one or more of said users to collect digital reputation and experience associated with said event.

7. The method of claim 1, wherein said application accepts said user inputs indicative of at least one of:
    said user checking into said at least one of said sessions,
    said user adding a session to said schedule,
    said user bookmarking information associated with said at least one of said sessions, an exhibitor, a speaker, a location, or a product of said event,
    said user creating an image or text information, and
    said user making a new contact; and
    when said application accepts said at least one of said user inputs while said application is active, said application automatically posts activity associated with at least one of said user inputs to said user's personal activity feed for said event.

8. The method of claim 1, wherein said application is configure to receive input associate with a plurality of events, the method further comprising:
    organizing user input into pages for each individual event of said plurality if events;
    issuing a unique user identifier associated with said individual event; and
    displaying said unique user identifier with a personal profile of said user, said unique user identifier providing said user's digital reputation associated with said individual event.

9. The method of claim 8, wherein said unique user identifier represent attendance by said user of said event associated with said unique user identifier.

10. The method of claim 8, wherein said unique user identifier comprises a link access to at least a selected portion of said user's input information associated with said event.

11. The method of claim 8, wherein said identifier and said link access provide users' personal activity feeds related to said event collected through passive sharing and associated with global user profiles.

12. The method of claim 8, wherein said unique user identifier and associated user's personal activity feed comprise digital reputation including said unique user identifiers and activity feed counts visible across said plurality of events associated with said user at the user level.

13. The method of claim 1, wherein said application is initialized on a photo-enabled device, the method further comprising selectively launching a photo feature within the application, said photo feature allowing said user to create images, said images comprising at least one image associated with said event from inside the application and selectively post said images directly to a session photo album or wall.

14. The method of claim 13, wherein said photo feature is activated from a session detail of said at least one of said sessions within said application, and said at least one image is automatically associated with said at least one of said sessions based on said unique session identifier as a time based activity at said event and made available for display by other users.

15. The method of claim 1, wherein said application provides for a user's activity feed for each of a plurality of events and a Uniform Resource Locator (URL) accessible via at least one of an email, SMS, and one or more social networks.

16. The method of claim 1, wherein said application provides on said user's feed a user-selectable input field accessible to other users for selectively expressing interest in another present or future event,
said method further comprising generating a list of said other users expressing interested is said present of future event.

17. The method of claim 1, wherein said application further comprises at least one of a list and a directory of a plurality of events, each of said events having a link associated therewith for downloading or displaying information for said event.

18. The method of claim 17, wherein each of said plurality of events is associated with one or more of said applications for initialization on one or more platforms simultaneously.

19. The method of claim 17, wherein said application comprises selective input for restricting display of information associated with an event,
whereby upon selection of said restrictive input for an event, said event will not be displayed in at least one of said list and said directory.

20. The method of claim 19, wherein said selective input comprises a user definable code for making accessibility to information associated with said event contingent on authentication of said code.

21. The method of claim 20, further comprising user login authentication, wherein upon authentication of said user's login information said events having a code associated therewith are selectively accessible by said user based on said login information.

22. The method of claim 1, wherein said application further comprises selective accessibility to information associated with in-progress events to preview changes and settings to said in-progress events before publication for accessibility by other users.

23. The method of claim 1, wherein at least one of said user inputs is indicative of at least one interaction of said user at said event.

24. A system for gathering, organizing, distributing and synchronizing information comprising:
at least one device comprising
a processor configured to execute instructions included in an application deployed on said device, and
a user interface
wherein said application is configuring to accept a plurality of user inputs via said user interface; and
a server that:
transmits push information to said device to automatically synchronize said application deployed on said device with a schedule of sessions at said event, said event comprising said sessions, upon registration for said event, said push information comprising a unique session identifier assigned to at least one of said sessions based on said schedule of said sessions at said event,
wherein:
said device
receives said push information, and automatically associate at least one of said user inputs with said at least one of said sessions at said event according to said schedule of said sessions at said event based on said unique session identifier, and
selectively generates, transmits or receives at least one real time activity feed comprising information associated with said at least one of said sessions at said event; and
said server
receives said activity feed from said device registered for said event,
organizes said user inputs into pages for said event,
associates a user's digital reputation with said event, and selectively transmits at least a portion of said information forming said activity feed information to at least one of
a social media account not associated with said event, and
at least one other device of another user registered for said event; and
said system further comprises at least one communication media supporting selective data transfer or sharing between said one device, said server, and at least one other device configured to display at least a portion of said activity feed information.

25. The system of claim 24, wherein said application comprises computer executable instructions stored on non-transitory computer readable media, and executable on at least one of said one device and said server, the instructions comprising:
initiating a mobile or web-based application configured to accept a plurality of user inputs and to associate said inputs with an event;
selectively combining at least a portion of said user inputs into information forming said activity feed of said user; and
selectively transmitting at least a portion of said information forming said user activity feed to at least one other mobile or web-based application.

26. The system of claim 25, wherein at least one of said one device and said server is configured to support at least one of said mobile and said web-based application.

27. The system of claim 24, wherein said one device accepts input via said user interface indicative of at least one of:
said user checking into said at least one of said sessions,
said user adding a session to said schedule,
said user bookmarking information associated with said at least one of said sessions, an exhibitor, a speaker, a location, or a product of said event, said user creating an image or text information, and
said user making a new contact; and when said application accepts said at least one of said user inputs while said application is active, said application automatically posts activity associated with at least one of said user inputs to said user's personal activity feed for said event.

28. The system of claim 24, wherein said application comprises computer executable instructions stored on non-transitory computer readable media, and executable on at least one of said one device and said server, the instructions comprising:

receiving input associate with a plurality of events;
organizing user input into pages for each individual event;
issuing a unique user identifier associated with an individual event; and
displaying said identifier with a personal profile of said user, said identifier providing a user's digital reputation associated with said individual event.

\* \* \* \* \*